US006949056B2

(12) United States Patent
Soroka et al.

(10) Patent No.: US 6,949,056 B2
(45) Date of Patent: Sep. 27, 2005

(54) MACHINE TOOL

(75) Inventors: Daniel P. Soroka, Horseheads, NY (US); Terrance Sheehan, Elmira, NY (US); Kevin L. Wasson, Pine City, NY (US); J. Patrick Ervin, Elmira, NY (US)

(73) Assignee: Hardinge Inc., Elmira, NY (US)

( * ) Notice: Subject to any disclaimer, the term of this patent is extended or adjusted under 35 U.S.C. 154(b) by 68 days.

(21) Appl. No.: 10/379,209

(22) Filed: Mar. 4, 2003

(65) Prior Publication Data

US 2004/0176229 A1 Sep. 9, 2004

(51) Int. Cl.⁷ ............................................... B23Q 3/157
(52) U.S. Cl. ........................... 483/14; 483/17; 29/27 C; 82/142
(58) Field of Search .............................. 483/14, 17, 18, 483/19, 20, 21, 22, 23, 24, 25, 26, 27; 409/165, 166, 167, 168; 29/27 C, 27 R; 74/813 R, 813 L; 82/142, 127

(56) References Cited

U.S. PATENT DOCUMENTS

| | | | |
|---|---|---|---|
| 4,506,569 A | | 3/1985 | Brown et al. |
| 4,577,389 A | * | 3/1986 | Shultz ........................ 483/23 |
| 4,785,513 A | | 11/1988 | Lee et al. |
| 5,115,546 A | | 5/1992 | Mitsukuchi et al. |
| 5,175,914 A | | 1/1993 | Mitsukuchi et al. |
| 5,293,793 A | | 3/1994 | Hessbruggen et al. |
| 5,367,754 A | | 11/1994 | Sheehan et al. |
| 5,439,431 A | * | 8/1995 | Hessbruggen et al. ........ 483/14 |
| 5,699,598 A | | 12/1997 | Hessbruggen et al. |
| 6,161,995 A | * | 12/2000 | Wakazono et al. .......... 409/191 |
| 6,203,254 B1 | | 3/2001 | Nashiki et al. |
| 6,464,623 B1 | * | 10/2002 | Laur et al. .................... 483/41 |

OTHER PUBLICATIONS

Hardinge, Quest High–Performance CNC Lathes, Catalog, May 2001.
Hardinge, Hardinge and Hardinge Companies, Catalog, 2001.
Hardinge, 5–To–6–Axis Swiss–Turn CNC Lathes, Catalog, Jan. 2001.
Hardinge, Pre–Engineered, Prepackaged Gary Tool Automation, Catalog, Feb. 2001.
Hardinge, Horizontal CNC Lathes, Catalog, 1998.

(Continued)

Primary Examiner—Derris H. Banks
Assistant Examiner—Dana Ross
(74) Attorney, Agent, or Firm—Phillips Lytle LLP

(57) ABSTRACT

An improved machine tool having a support structure (16), a spindle (18) rotatably supported by the structure, the spindle adapted for engagement with a workpiece (56), the spindle operatively arranged to selectively rotate in an annular A-axis (19) and about a linear Z-axis (20), a tool frame (25) supported by the structure, the tool frame having an array of individual tool-holding stations adapted for engagement with a tool (49), an actuating mechanism (24), the actuating mechanism operatively arranged to selectively provide movement of the workpiece in the spindle relative to the tool in the tool frame in the Z-axis, in a linear Y-axis (21) that is perpendicular to the Z-axis, and in a linear X-axis (22) that is perpendicular to both the Z-axis and the Y-axis, the position of the stations in the array defined by at least an X-axis coordinate and a Y-axis coordinate, at least two of the stations in the array positioned such that the two stations have neither the same X-axis coordinate nor the same Y-axis coordinate. The tool frame may comprise a tool frame actuating portion operatively arranged to selectively rotate in an annular axis that is about a linear axis that is not the Z-axis, and the annular axis may be a B-axis that is about the Y-axis.

17 Claims, 27 Drawing Sheets

OTHER PUBLICATIONS

Hardinge, T–Series Production CNC Lathes, Catalog, May 1998.

Hardinge, Quest TwinTurn 65 Multi–Tasking CNC Turning Centers, Catalog, Nov. 2001.

Hardinge, Quest Multi–Tasking CNC Lathes, Catalog, Dec. 2001.

Hardinge, Swiss–Type CNC Lathes, Catalog, 1998.

Mazak, Integrex 200SY & 200Y Mill Center with Y–axis Control, Marketing Material, Prior to Effective Filing Date.

Heger & Wiens, Dynamic System Identification of Parallel Kinematic Machines, Paper, Prior to Effective Filing Date.

Wavering, Parallel Kinematic Machine Research at NIST: Past, Present, and Future, Paper, Aug. 1998.

* cited by examiner

MACHINE TOOL

TECHNICAL FIELD

The present invention relates generally to the field of machine tools and, more particularly, to a machine tool having increased operational versatility.

BACKGROUND ART

A number of types of machine tools are known and used in the prior art. Such machine tools generally fall into the three categories.

The first category can be broadly described as turret-based turning machines. An example of this type of tool is the QUEST multi-tasking turning center provided by Hardinge Inc. of Elmira, N.Y. Generally, these machine tools are provided with a spindle and a turret on which tooling is mounted. The workpiece is either fed in bar stock through the spindle or a chuck is used to hold an individual workpiece slug in place. Generally, this type of machine tool operates in the X-axis, Z-axis and A-axis, although optional operation in the Y-axis can be provided;

A second category of machines are generally referred to as Swiss-turning machines. An example of this type of tool is Hardinge Inc.'s CONQUEST ST Swiss type lathe. Generally, these machine tools are used for workpieces having a length to diameter ratio of greater than four-to-one and operate in the X-axis, A-axis and sometimes in the Y-axis. A guide bushing rather than a collet is used to allow the workpiece to advance in the Z-axis and the tool generally engages the workpiece in the X-axis near the guide bushing.

A third category of machines are generally referred to as gang tool turning machines. An example of this type of tool is Hardinge Inc.'s CONQUEST GT gang tool lathe. Generally, these machine tools operate in the X-axis, Z-axis and A-axis with the tooling orientated linearly on a tool plate that moves in the X-axis However, each of the machine tools known in the prior art are limited in the type of cutting that they perform. This limitation arises in large part from the fact that each machine only operates in a limited number of axes. Accordingly, it would be beneficial to have a machine tool which allows for relative movement in a larger combination of axes, thereby providing a machine tool having greater versatility of operation and one that can machine complex items in a single cutting process.

DISCLOSURE OF THE INVENTION

With parenthetical reference to the corresponding parts, portions or surfaces of the disclosed embodiment, merely for the purposes of illustration and not by way of limitation, the present invention provides an improved machine tool (15) comprising a support structure (16), a spindle (18) rotatably supported by the structure, the spindle adapted for engagement with a workpiece (56), the spindle operatively arranged to selectively rotate in an annular A-axis (19) and about a linear Z-axis (20), a tool frame (25) supported by the structure, the tool frame having an array (45) adapted for engagement with a tool (49), an actuating mechanism (24), the actuating mechanism operatively arranged to selectively provide movement of the workpiece in the spindle relative to the tool in the tool frame in the Z-axis, in a linear Y-axis (21) that is perpendicular to the Z-axis, and in a linear X-axis (22) that is perpendicular to both the Z-axis and the Y-axis, the position of the stations in the array defined by at least an X-axis coordinate and a Y-axis coordinate, at least two of the stations in the array positioned such that the stations have neither the same X-axis coordinate nor the same Y-axis coordinate. The tool frame may comprise an actuating portion (26), the actuating portion operatively arranged to selectively rotate in an annular axis that is about a linear axis that is not the Z-axis. The actuating portion may be operatively arranged to selectively rotate in an annular B-axis (23) that is about the Y-axis. The actuating mechanism may comprise a spindle actuating mechanism (24) between the structure and the spindle, the spindle actuating mechanism operatively arranged to selectively move the spindle in the Z-axis, in a linear Y-axis that is perpendicular to the Z-axis, and in a linear X-axis that is perpendicular to both the Z-axis and the Y-axis.

The spindle actuating mechanism may comprise an actuating spindle carriage (28), an actuating vertical carriage (29), an actuating horizontal carriage (31), the actuating spindle carriage between the spindle and the vertical carriage, the vertical carriage between the spindle carriage and the horizontal carriage, the horizontal carriage between the vertical carriage and the support structure, the spindle carriage operatively arranged to move in the Z-axis relative to the vertical carriage, the vertical carriage operatively arranged to move in the Y-axis relative to the horizontal carriage, and the horizontal carriage operatively arranged to move in the X-axis relative to the support structure. The spindle actuating mechanism may have the actuating spindle carriage between the spindle and the horizontal carriage, the horizontal carriage between the spindle carriage and the vertical carriage, the vertical carriage between the horizontal carriage and the support structure, the spindle carriage operatively arranged to move in the Z-axis relative to the horizontal carriage, the horizontal carriage operatively arranged to move in the X-axis relative to the vertical carriage, and the vertical carriage operatively arranged to move in the Y-axis relative to the support structure. The spindle actuating mechanism may be operatively arranged to simultaneously provide components of motion of the spindle in at least two axes selected from the group consisting of the Y-axis, the Z-axis, and the X-axis. The spindle actuating mechanism (35) may comprise a member (33) inclined relative to a plane defined by the Z-axis and the X-axis, an actuating slide (34) between the spindle and the inclined member, the actuating slide operatively arranged to move substantially parallel to the inclined member, whereby the spindle is operatively arranged to move simultaneously in the Y-axis and X-axis. The spindle actuating mechanism may further comprise an actuating carriage (36) between the slide and the support structure, the actuating carriage supporting the incline member, and the actuating carriage operatively arranged to move in the Z-axis relative to the support structure.

The actuating mechanism may comprise a tool frame actuating mechanism (38) between the support structure and the tool frame, the tool frame actuating mechanism operatively arranged to selectively move the tool frame in a linear X-axis that is perpendicular to both the Z-axis and the Y-axis.

The array may be a rectilinear array (109) or an annular array (110). The tool may be selected from a group consisting of a live tool (49), a static tool (51), an internal diameter tool (54), a laser, a bar puller, a workpiece holder (107), an engraving tool, a stamp, and a measuring gauge. The stations may be adapted to hold interchangeable tools. The array may be adapted for high density tooling. The tool frame may comprise a polygonal body (59) having multiple faces, at least one of the multiple faces having the array (60) of individual tool holding stations.

A first tool frame (106) may be detachable from the support structure such that an alternate tool frame (62) is interchangeable with the first tool frame. The machine tool may further comprise a second machine tool (42) oriented opposite to the first machine tool. The machine tool may further comprise an automatic bar feed. The tool frame may comprise a holder (107) for holding the workpiece, and the spindle and the workpiece holder may be operatively arranged to allow the workpiece to be transferred between the spindle and the workpiece holder. The machine tool may further comprise a workpiece conveyor (66) wherein the spindle and conveyor are operatively arranged to allow the workpiece to be transferred between the spindle and the conveyor. The support structure may comprise a spindle base (70) and a tool frame base (63) and the tool frame base may be detachable from the spindle base whereby an alternate tool frame base (64) is interchangeable with the tool frame base.

The present invention also includes a machine tool (15) comprising a support structure (16), a spindle (18) rotatably supported by the structure, the spindle adapted for engagement with a workpiece (56), the spindle operatively arranged to selectively rotate in an annular A-axis (19) and about a linear Z-axis (20), a spindle actuating mechanism (24) between the structure and the spindle, the spindle actuating mechanism operatively arranged to selectively move the spindle in the Z-axis, in a linear Y-axis (21) that is perpendicular to the Z-axis, and in a linear X-axis (22) that is perpendicular to both the Z-axis and the Y-axis, and a tool frame (25) supported by the structure.

The present invention also includes a machine tool comprising a support structure, a spindle rotatably supported by the structure, the spindle adapted for engagement with a workpiece, the spindle operatively arranged to selectively rotate in an annular A-axis and about a linear Z-axis, a tool frame supported by the structure, the tool frame having an array of individual tool-holding stations adapted for engagement with a tool, the position of the stations in the array defined by at least a Y-axis, which is perpendicular to the Z-axis, coordinate and a X-axis, which is perpendicular to both the Z-axis and the Y-axis, coordinate, at least two of the stations located in the array positioned such that the stations have neither the same X-axis coordinate nor the same Y-axis coordinate, an actuating mechanism, the actuating mechanism operatively arranged to move the workpiece in the spindle to engage the tool in the station.

The invention also includes a machine tool having a support structure, a spindle rotatably supported by the structure, the spindle adapted for engagement with a workpiece and a tool, the spindle operatively arranged to selectively rotate in an annular A-axis that is about a linear Z-axis, a spindle actuating mechanism between the structure and the spindle, the spindle actuating mechanism operatively arranged to selectively move the spindle in the Z-axis, in a linear Y-axis that is perpendicular to the Z-axis, and in a linear X-axis which is perpendicular to both the Z-axis and the Y-axis, a tool frame supported by the structure, the tool frame comprising a holder (107) for holding the workpiece, a tool changer (72) supported by the structure, the spindle and workpiece holder operatively arranged to allow the workpiece to be transferred between the spindle and the workpiece holder, the spindle and the tool changer operatively arranged to allow a tool to be transferred between the tool changer and the spindle.

Accordingly, the general object of the present invention is to provide an improved machine tool which allows for relative movement in a combination of axes.

Another object of the invention is to provide a machine tool which will easily accommodate multiple process types.

Another object of the invention is to provide a machine tool which allows for the interchangeable use of a high number of tools.

Another object of the invention is to provide a machine tool which has the ability to finish a complex part complete.

Another object of the invention is to provide a machine tool which allows for multiple cutting configurations.

Another object of the invention is to provide a machine tool which allows for high tooling density.

Another object of the invention is to provide a machine tool which has the ability to perform both turning and milling operations.

Another object of the invention is to provide a machine tool with an improved tool frame.

Another object of the invention is to provide a machine tool having a tool frame which allows for simplified interchangeability of tool parts.

Another object of the invention is to provide a machine tool having a wide range of tooling options.

Another object of the invention is to provide a machine tool having a tool frame adapted for static tooling as well as live tooling.

Another object of the invention is to provide a machine tool having a tool frame adapted for grinders, lasers, finishing heads, bar pullers and measuring gauges.

Another object of the invention is to provide a machine tool allowing for combination cutting such as turn/milling, turn/super finishing, turn/laser engraving, turn/grinding, and turn followed by limited assembly.

Another object of the invention is to provide a machine tool with tooling options that are greater then fixed-position turret configurations.

Another object of the invention is to provide a machine tool which allows for the option of a mounted turret.

Another object of the invention is to provide a machine tool which allows for easy part-catching operations because of the functionality of the spindle.

Another object of the invention is to provide a machine tool having a post or tombstone tool frame.

Another object of the invention is to provide a machine tool allowing for automatic bar feeding.

Another object of the invention is to provide a machine tool having a tooling changer.

Another object of the invention is to provide a machine tool having multiple levels of flexibility.

Another object of the invention is to provide a machine tool having a structure that allows for the interchangeability of tool frames.

Another object of the invention is to provide a machine tool having a structure that allows for the interchangeability of tool frame basis and spindle bases.

Another object of the invention is to provide a machine tool having the ability to be reconfigured.

DESCRIPTION OF THE PREFERRED EMBODIMENTS

Figure 1:
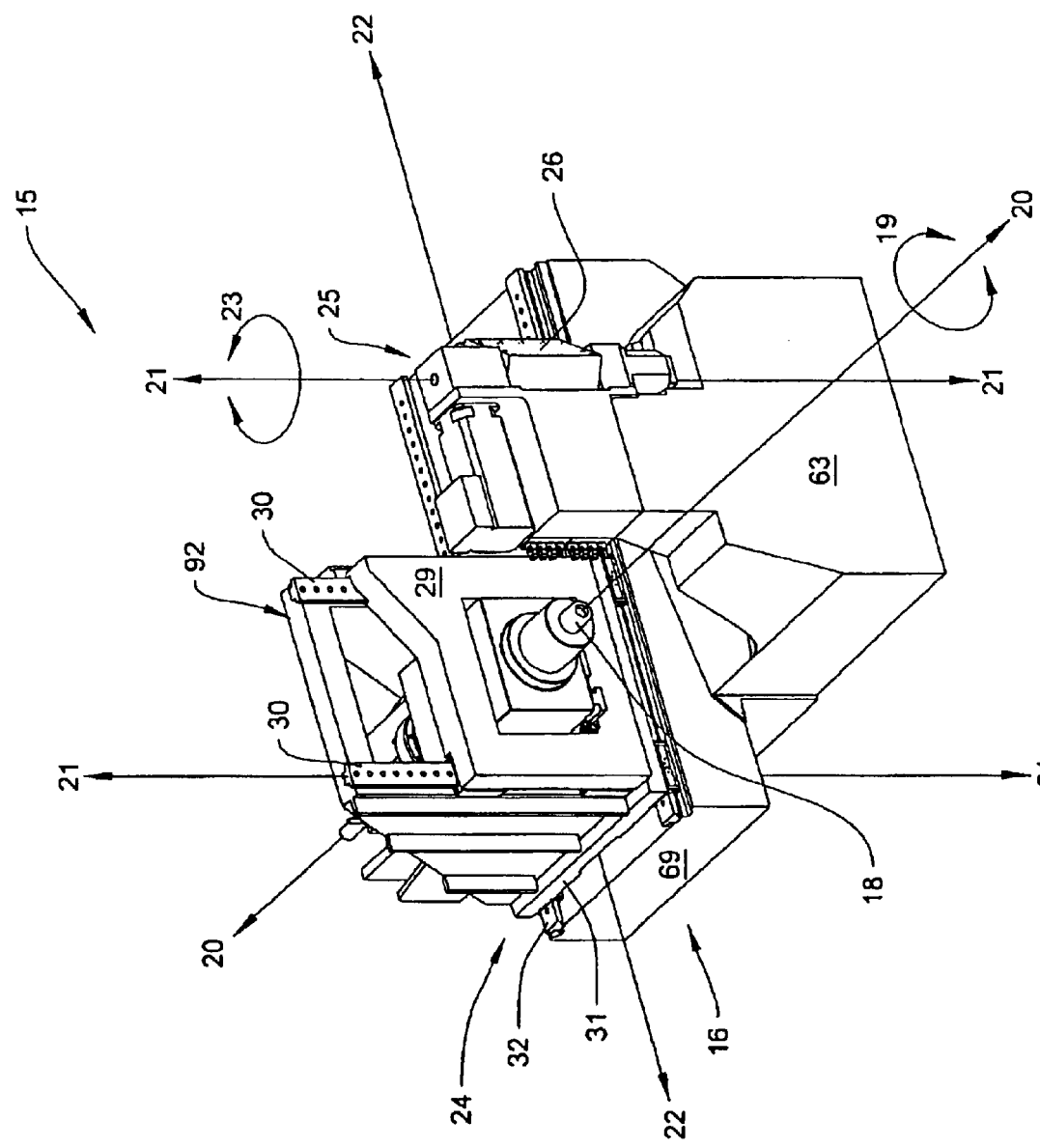
FIG. 1 is a perspective view of the improved machine tool.

At the outset, it should be clearly understood that like reference numerals are intended to identify the same structural elements, portions or surfaces, consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings and, more particularly, to FIG. 1 thereof, this invention provides an improved machine tool, the presently preferred embodiment of which is generally indicated at 15. Machine tool 15 is shown as broadly including a support structure 16, a spindle 18, a spindle actuating mechanism 24 and a tool frame 25.

Spindle 18 is a conventional spindle configured to hold a workpiece and to rotate in an annular axis 19 and about a linear axis 20. The spindle grips the workpiece with a convention spindle workpiece holder, such as a collet properly configured for the subject workpiece.

Figure 2:
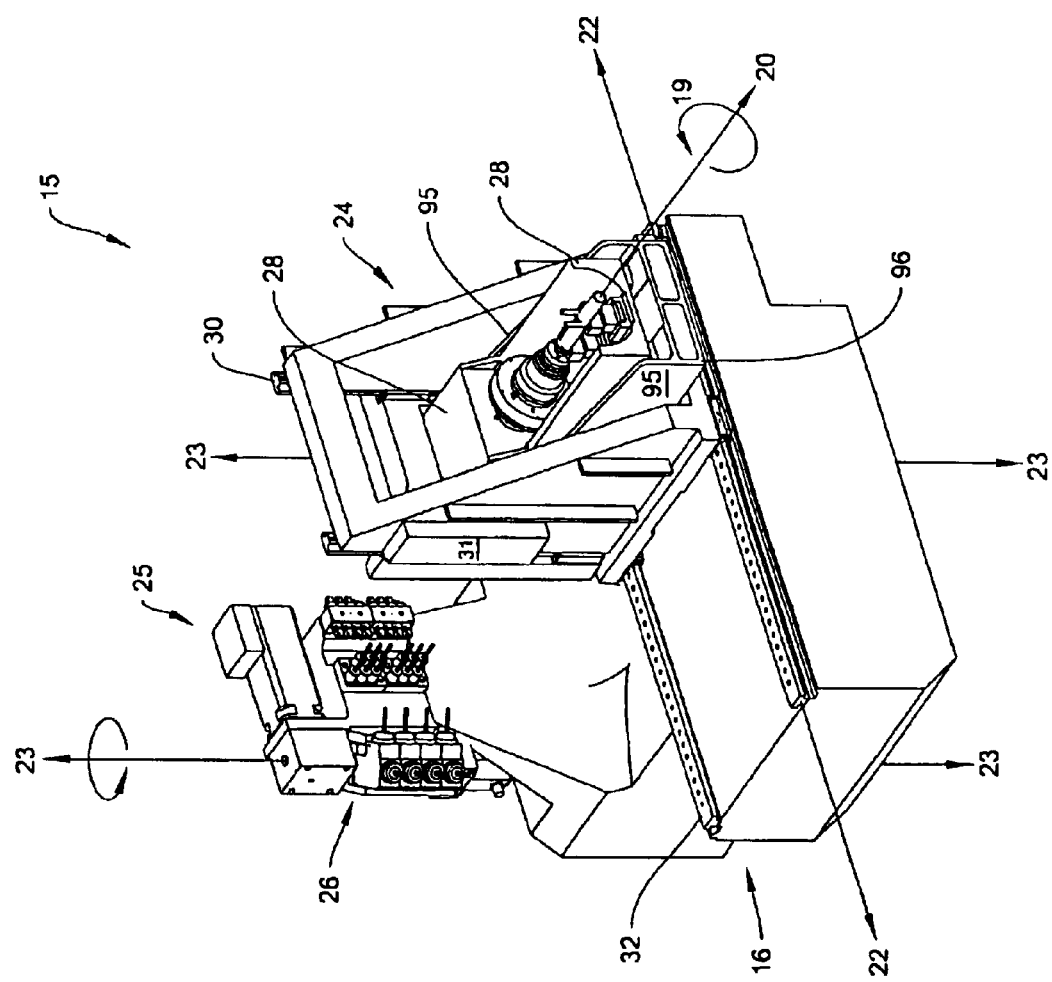
FIG. 2 is a rear perspective view of the machine tool shown in FIG. 1.
Figure 3:
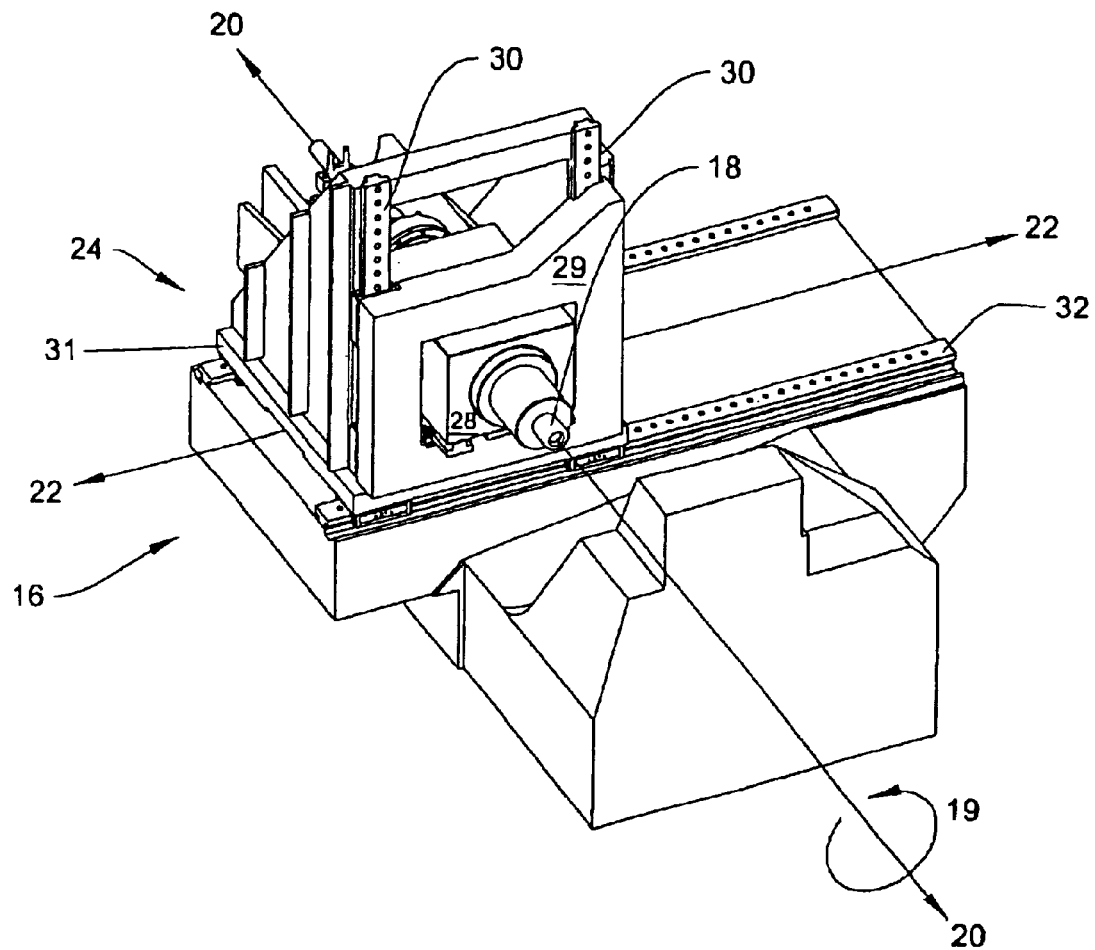
FIG. 3 is a perspective view of the spindle actuating mechanism shown in FIG. 1.

As shown in FIGS. 1–3, spindle actuating mechanism 24 is shown as broadly including a spindle carriage 28, a vertical carriage 29, and a horizontal carriage 31. Two parallel horizontal guide rails 32 mounted to the top planar surface of support structure 16 extend along axis 22. Horizontal carriage 31 travels laterally on guide rails 32 along axis 22. Horizontal carriage 31 supports a tower 92 having parallel vertical guide rails 30 extending along axis 21. Vertical carriage 29 travels vertically on guide rails 30 along axis 21. As shown in FIG. 2, vertical carriage 29 supports an actuating spindle carriage 28. Vertical carriage 29 has tapered sidewalls 95 and a base 96, which define a channel extending longitudinally along axis 20. Spindle carriage 28 travels longitudinally in the channel of vertical carriage 29 along axis 20. Conventional linear motors control the movements of spindle carriage 28 relative to vertical carriage 29, the movement of vertical carriage 29 along vertical guide rails 30, and the movement of horizontal carriage 31 along horizontal guide rails 32. It is contemplated that other means of conveyance may be used, such as conventional ball-screw driven servo-motor systems or a Parallel Kinematic Machine (PKM), to advance the carriages.

With this configuration, spindle 18 is able to move in combination of three axes, namely axis 20, axis 21 and axis 22. The spindle can move up and down relative to tool frame 25, can move side to side relative to tool frame 25, can move towards and away from tool frame 25, or can have a components of motion in one or more of these three axes. In this way, a workpiece in spindle 18 can be moved relative to a tool in tool frame 25 in all three axes. As used herein, references to movement in a particular axis includes movement which has a component of motion in that axis. When reference is made to the spindle being able to move in all three axes, it is understood that the actuating mechanism may do so by moving the spindle linearly in series or by moving simultaneously so as to have a component of motion in two or more of the three axes.

Although not shown, it is contemplated that an automatic bar feed system may be installed to the rear of spindle 18. When in use, at the beginning of the machining process, spindle 18 is positioned to a pre-determined location and a conventional bar feed device loads a bar into spindle 18. Once loaded and the workpiece clamped in the spindle, the bar feed device is retracted and waits for the loaded bar in the spindle to be consumed. As the bar is consumed it is advanced forward toward tool frame 25 with a bar-puller (not shown) located on tool frame 25. When the bar has been fully consumed, spindle 18 is repositioned so that another bar may be loaded. The bar feeder may be equipped with a feed rack so that a large quantity of bar segments can be loaded and automatically dispensed as required.

Figure 4:
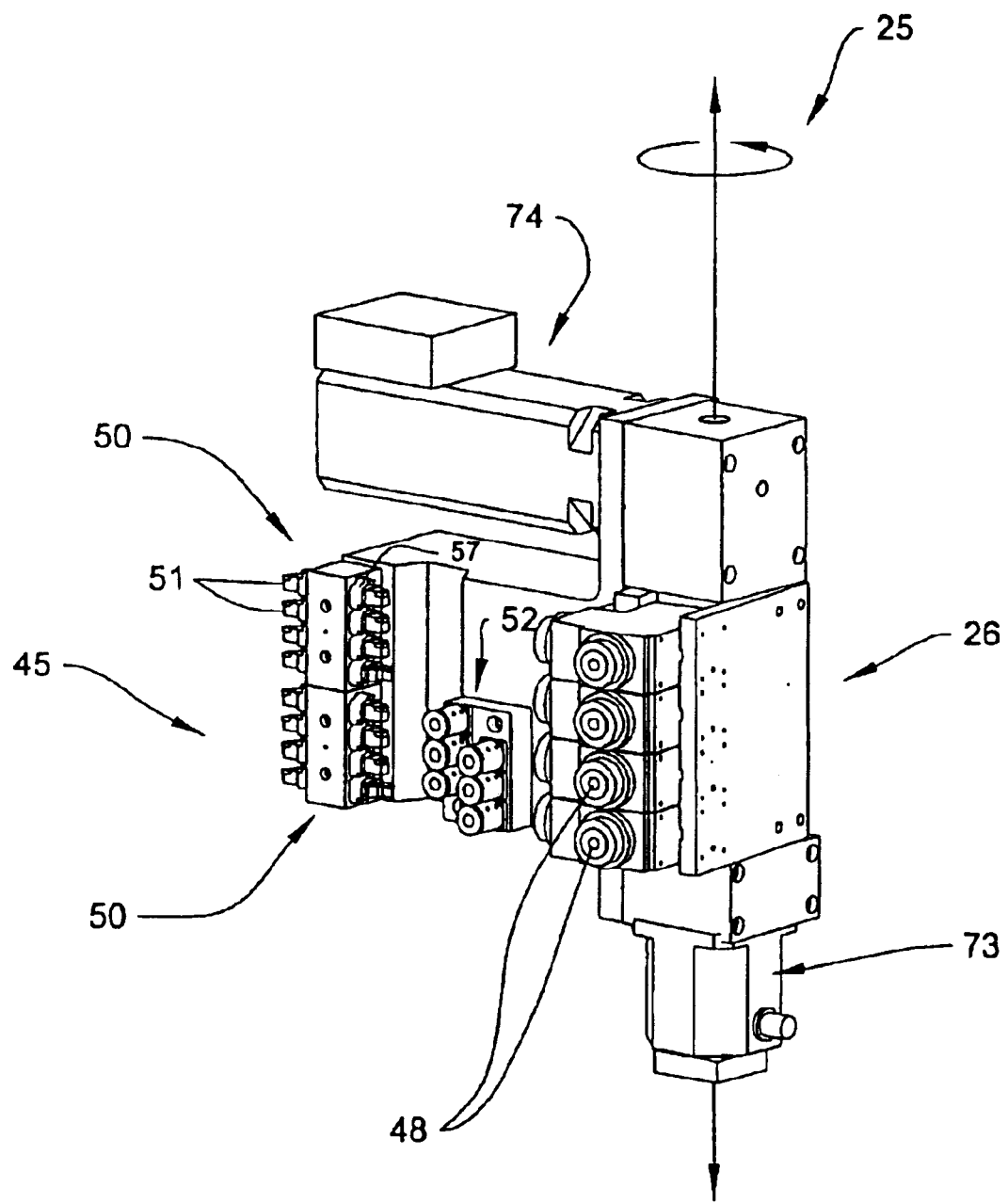
FIG. 4 is a detailed perspective view of the tool frame shown in FIG. 1.

As shown in FIG. 4, tool frame 25 is specially configured with a high-density array 45 of stations for holding outside diameter turning tools, inside diameter tools and live tools. On the left side of tool frame 25 are located the stations for high density turning tools, at the center of tool frame 25 are located the stations for high-density outside diameter tools, and on the right side of tool frame 25 are located the stations for live-tooling. Unlike other designs, tool frame 25 has an array which is grid-like, as opposed to a straight line (such as in a gang tool).

Figure 27:
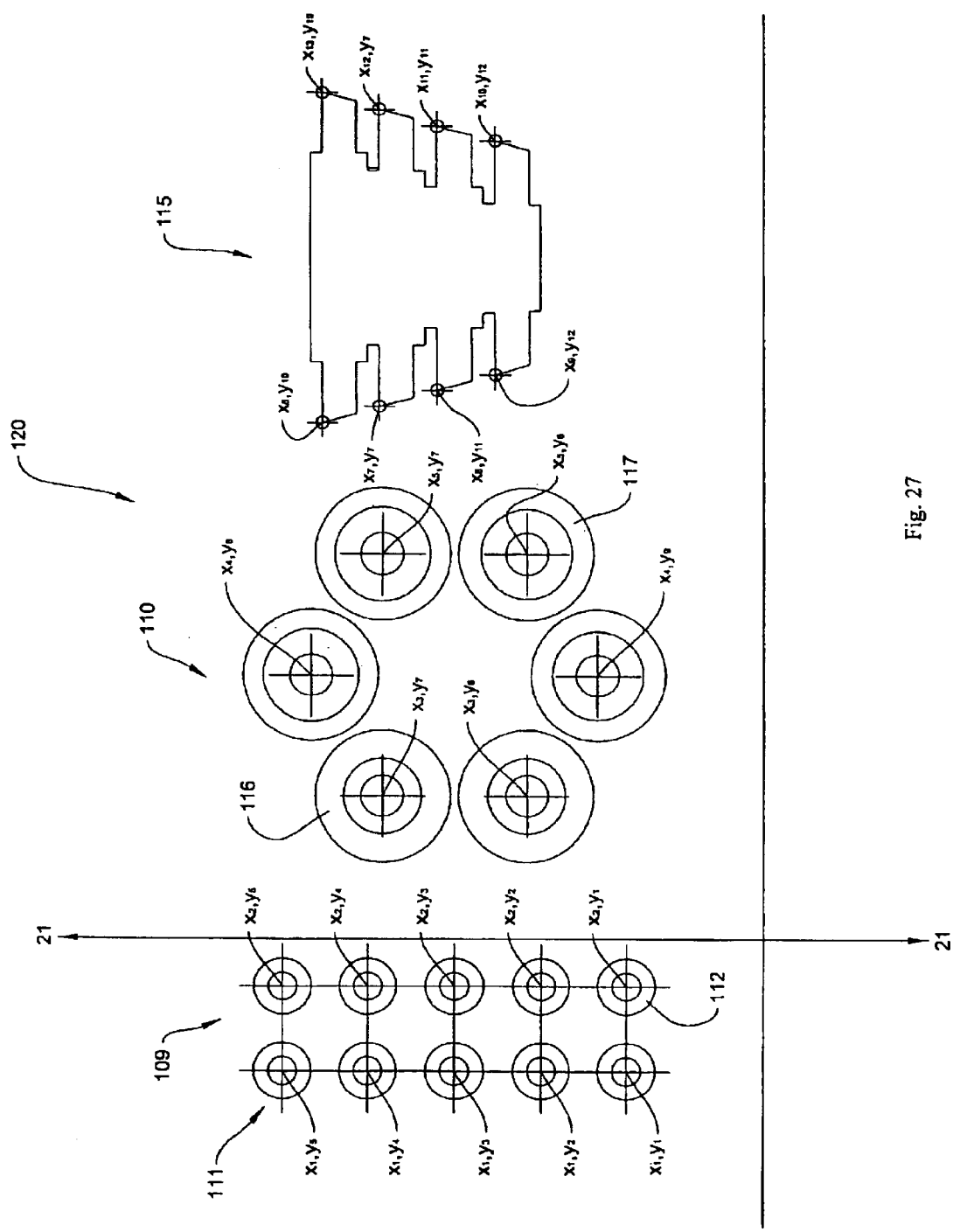
FIG. 27 is a diagram showing alternate embodiments of tool station arrays.

As shown in FIG. 27, the array may have other configurations, such as a rectilinear configuration 109, an annular configuration 110, or a V-configuration 115. Each of these configurations is characterized by the positioning of the stations in an X-axis 22 and Y-axis 21 coordinate system such that at least two of the stations, for example stations 111 and 112 shown in FIG. 27 or stations 113 and 114 in FIG. 4, have neither the same X-axis coordinate nor the same Y-axis coordinate. The position of the stations may be defined by a third Z-axis 20 coordinate that may be the same or may vary between stations.

As shown in FIG. 4, the tools are arranged on mounting blocks or members, with the turning or static tools located on two static tool blocks 50, the inside diameter tools located on an internal diameter tool block 52, and the live tools located on actuating member 26. Each of these tools blocks or members may be customized or redesigned to accommodate other applications or other process devices. In addition, a tool block having accessory tools may also be mounted to the tool frame. Such an accessory tool block would include an array of tools such as conventional bar pullers, conventional workpiece holders, conventional measuring gages, conventional part catchers and conventional rolling part stamps.

Actuating member 26, which supports live tool spindles 48, is located on the right side of tool frame 25. Actuating member 26 rotates in an annular axis 23 and about axis 21 with a 90-degree rotation range. Thus, with rotation about axis 21, each of spindles 48 can accommodate any position within that 90 degree rotation range. Base portion 73 of tool frame 25 houses a conventional servo-motor which controls the rotation of actuating member 26. Spindle 48 housings are supported on two of the four outside faces of actuating member 26. Each of these two faces contain four conventional spindles adapted for use with live or rotary tools. Spindles 48 operate at 8000 RPM. Conventional spindle motors are housed in housing 74 and drive the various rotating spindles 48 on member 26.

Figure 10:
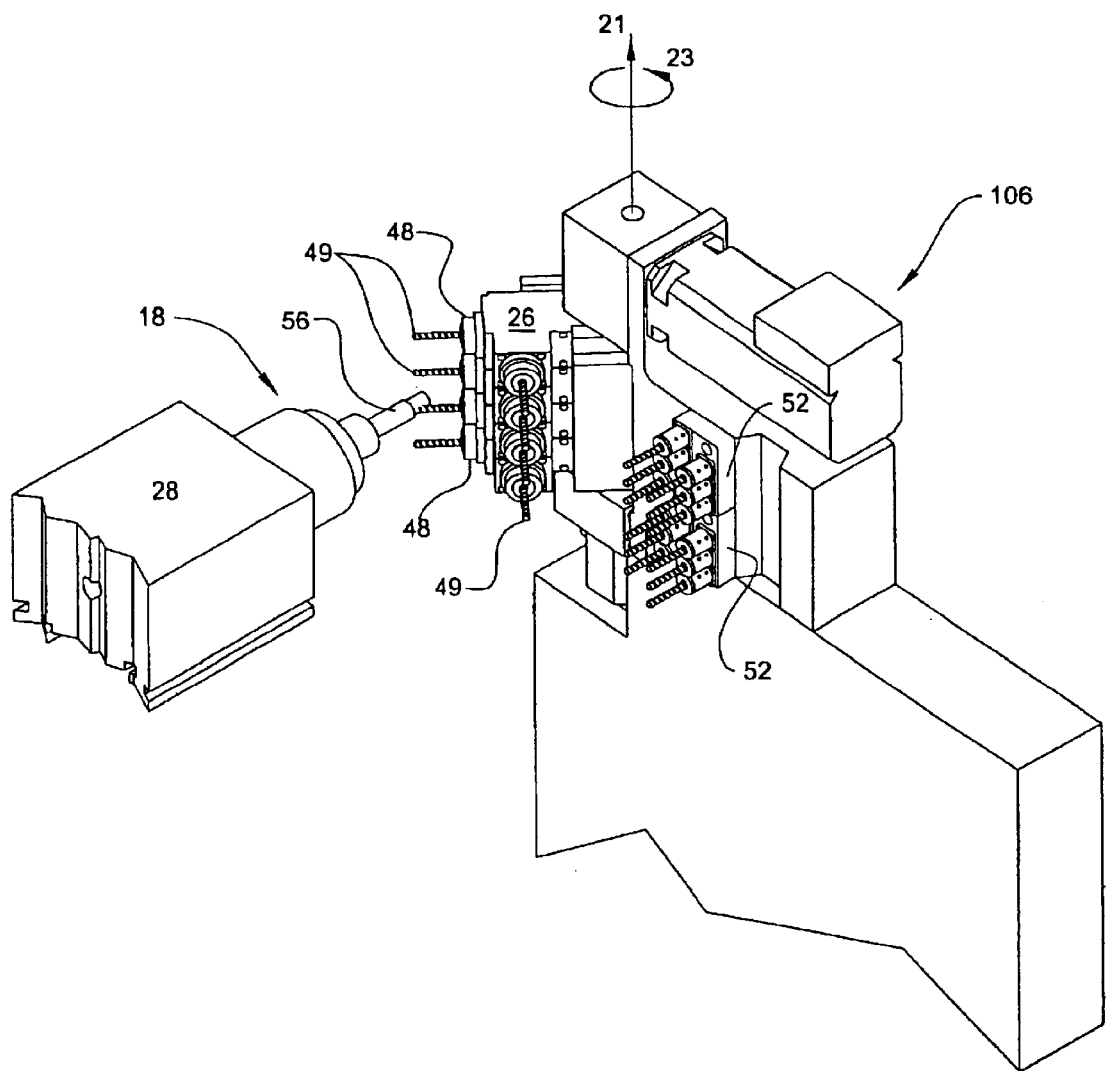
FIG. 10 is a perspective view of the live tooling of the tool frame shown in FIG. 5 engaging a workpiece.

FIG. 10 shows live tools 49 in spindles 48. The live tools shown in FIG. 10 are conventional drills, but other driven tools such as taps or mills may be used. As a result of the ability to rotate member 26 through a 90-degree rotation range, milling and drilling work off the axis of rotation of the workpiece can be easily accommodated when spindle 18 is not rotating. Also, since static blocks 50 are not located on the same reference frame as live tool blocks 46, there is no cycle time lost when positioning member 26. Member 26 can be positioned when the workpiece is being machined at static tool block 50.

As shown in FIG. 4, internal diameter tool block 52 has twelve high density spaced housings for internal diameter tools. Each static tool block 50 has eight high density spaced static tool housings 57. Static tool blocks 50 are positioned one above the other. In the preferred embodiment, tool blocks 50 and 52 are attached to tool frame 25 with threaded fasteners, allowing for easy detachment and replacement with an alternate configuration of housings or tools. It is contemplated that other quick change systems, such as a cam-lock system, may be used to provide mechanical detachment and substitution of tool blocks.

The array of tool stations provided in tool frame 25 allows for a combination of cutting processes and features, including turning work, end work, center-axis work, mill work, tap work, cut-off work, and cross-axis work. It also improves the part producing speed of the machine, due to the short distances between tools, the large number of tools, and the elimination of turret index time. Furthermore, the addition of an accessory tool block allows for increased automation of processes and manipulation of the workpiece.

Figure 5:
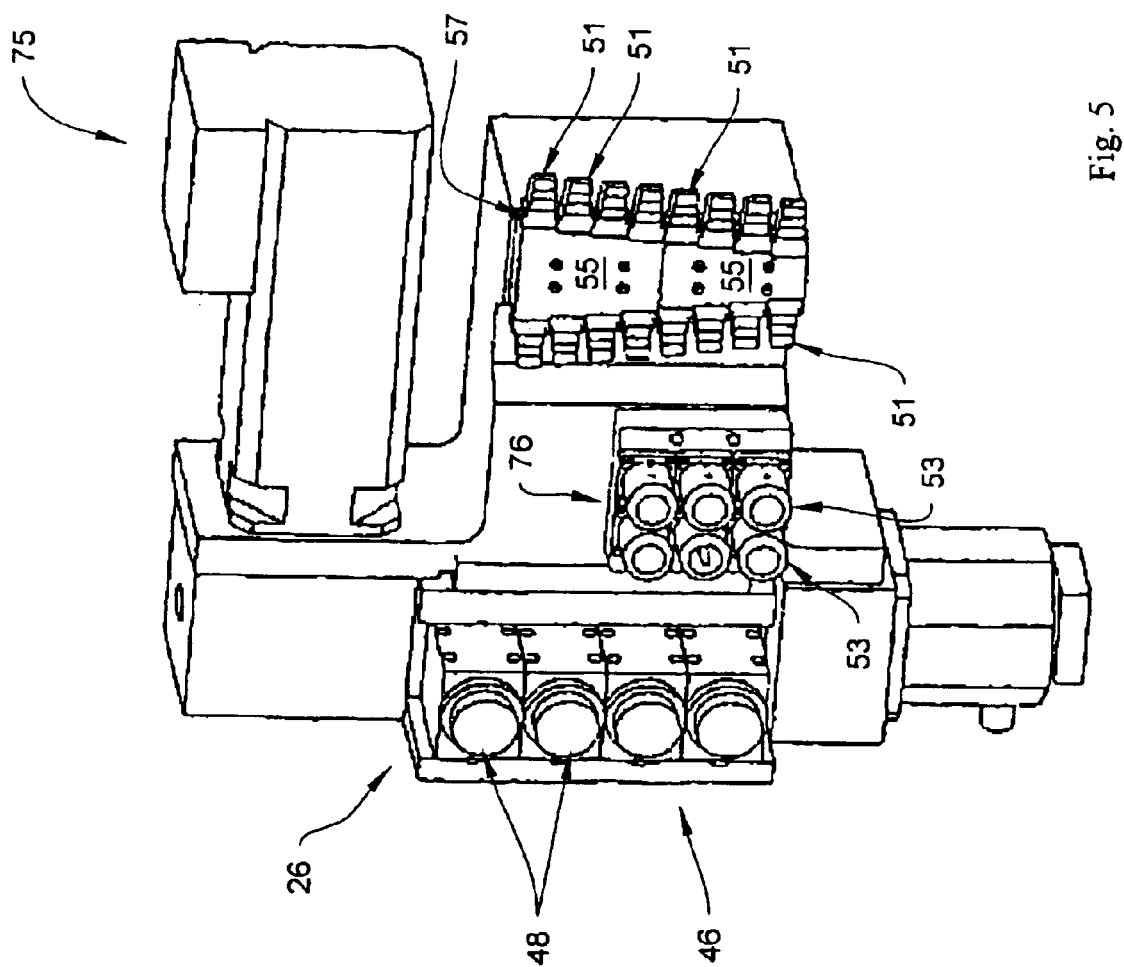
FIG. 5 is a detailed perspective view of an alternate tool frame configuration.

FIG. 5 shows an alternate embodiment of the tool frame shown in FIG. 4. In this embodiment, actuating member 26 is located on the left side of tool frame 76 and static tool blocks 55 are located on the right side. Internal diameter tool block 76 shown in FIG. 5 has six housings 53, rather than twelve as in FIG. 4. Also, static tool blocks 55 are aligned in a V array configuration, rather than the parallel rectilinear configuration shown in FIG. 4.

Figure 6:
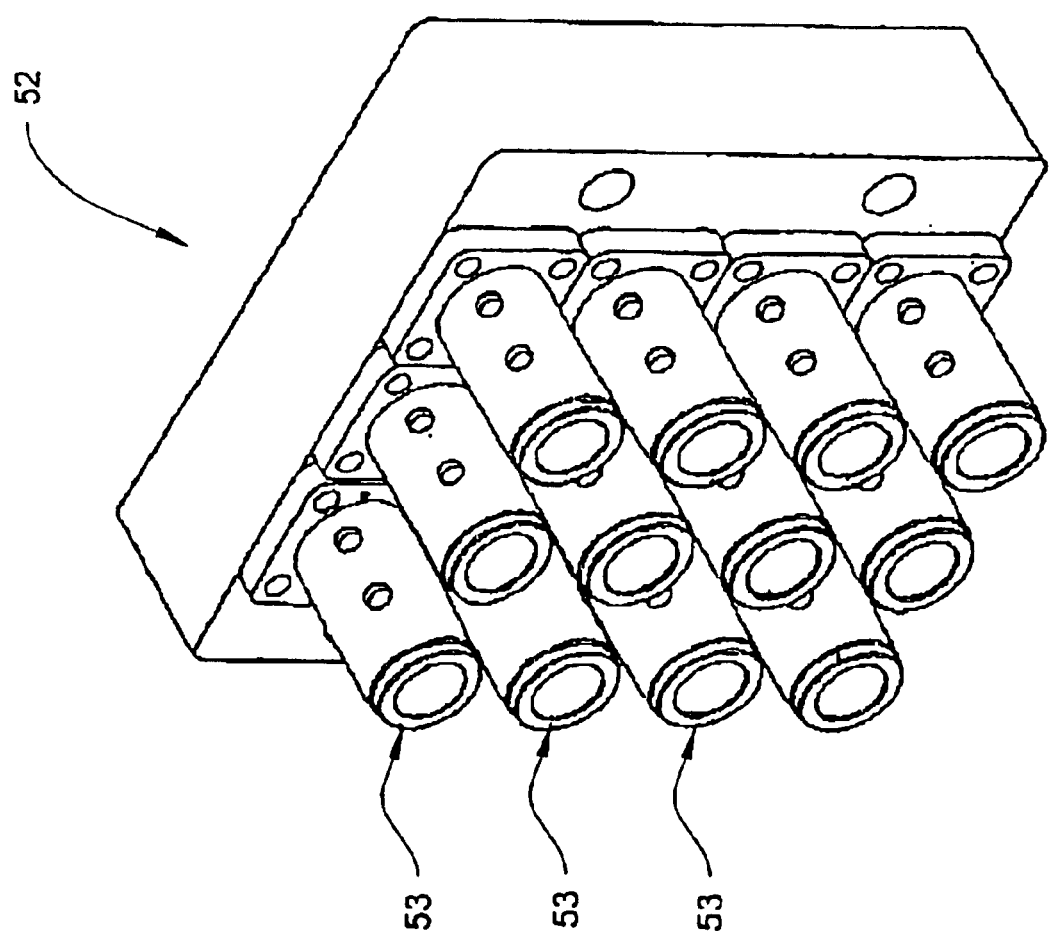
FIG. 6 is a detailed perspective view of the internal diameter tool block shown in FIG. 4.
Figure 8:
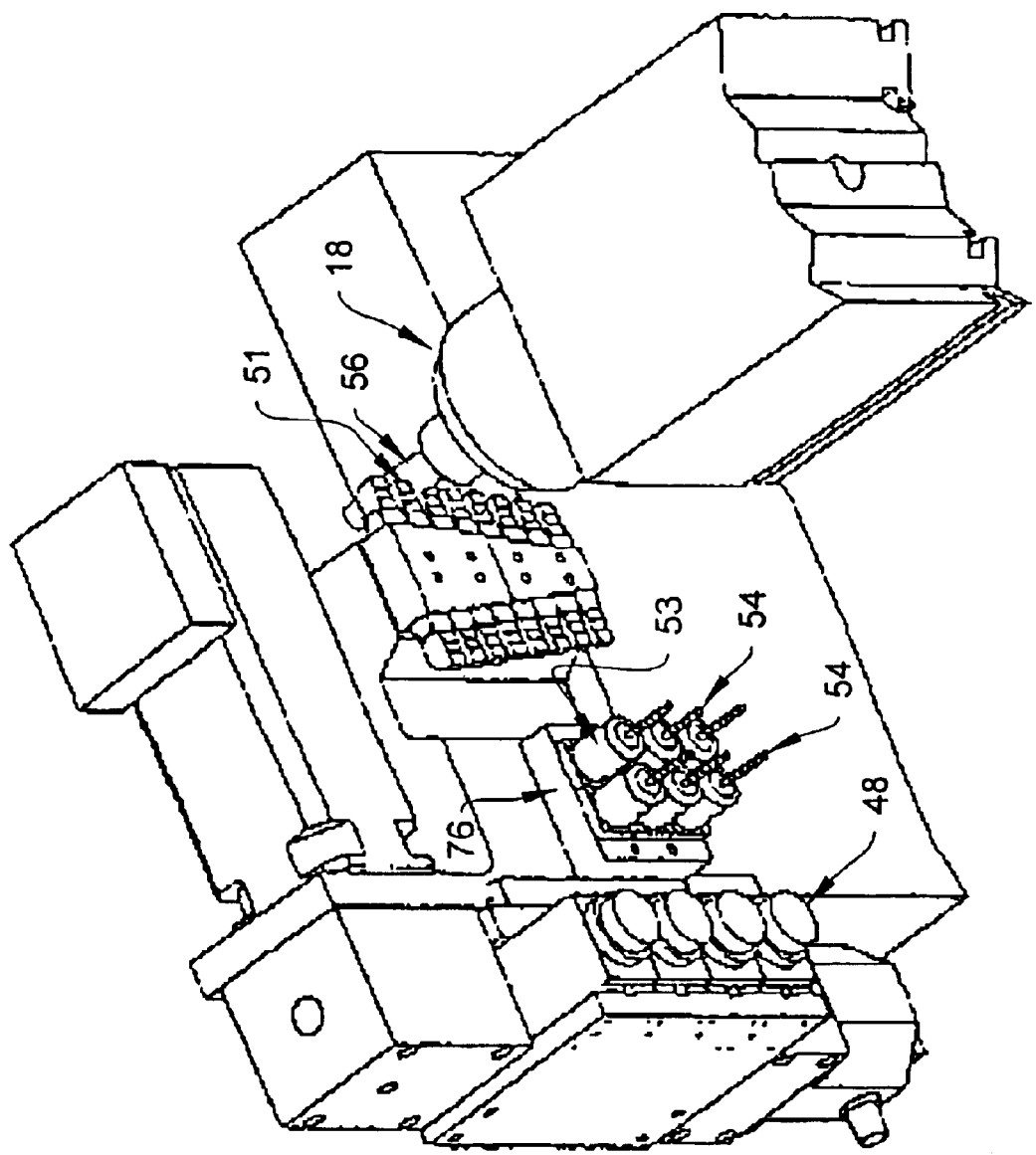
FIG. 8 is a perspective view of the static tooling of the tool frame shown in FIG. 5 engaging a workpiece.

FIG. 6 shows a detailed view of the internal diameter tool block 52 shown in FIG. 4. As shown, internal diameter tool block 52 includes twelve conventional tool holders, severally indicated at 53. Each tool holder 53 has a bore into which the tool shaft fits with an appropriately sized bushing. The tool shaft and bushing are held in place with a pair of set screws. As indicated, each particular holder 53 may be removed and replaced with an alternate holder. Alternatively, internal diameter tool block 52 may be removed from tool frame 25 and replaced with an alternate tool block. FIG. 8 shows tools 54 in stations 53 of block 76. In this embodiment, tools 54 is a fixed drill. Other internal diameter tools, such as center drills, mills, taps, boring bars, grooving tools, and other center-axis cutting tools, may be used.

Figure 7:
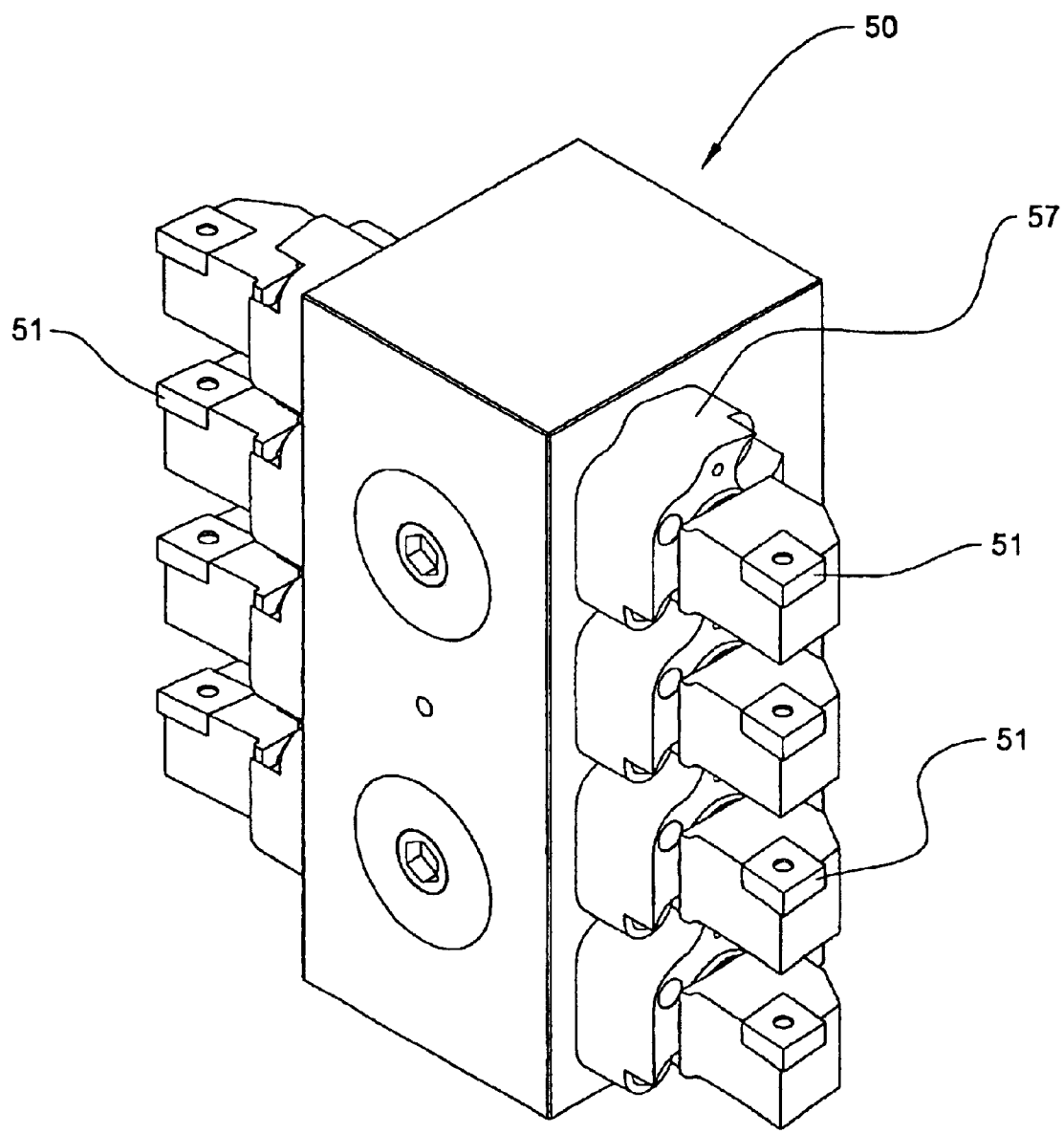
FIG. 7. is a detailed perspective view of one of the static tool blocks shown in FIG. 4.

FIG. 7 is a detailed view of static tool block 50. As shown, tool block 50 has eight turning tool housings, severally indicated at 57, and eight turning tools, severally indicated at 51, secured in housing 57. Other static tools such as cut-offs, threading tools, knurling tools and grooving tools may be used.

Figure 9:
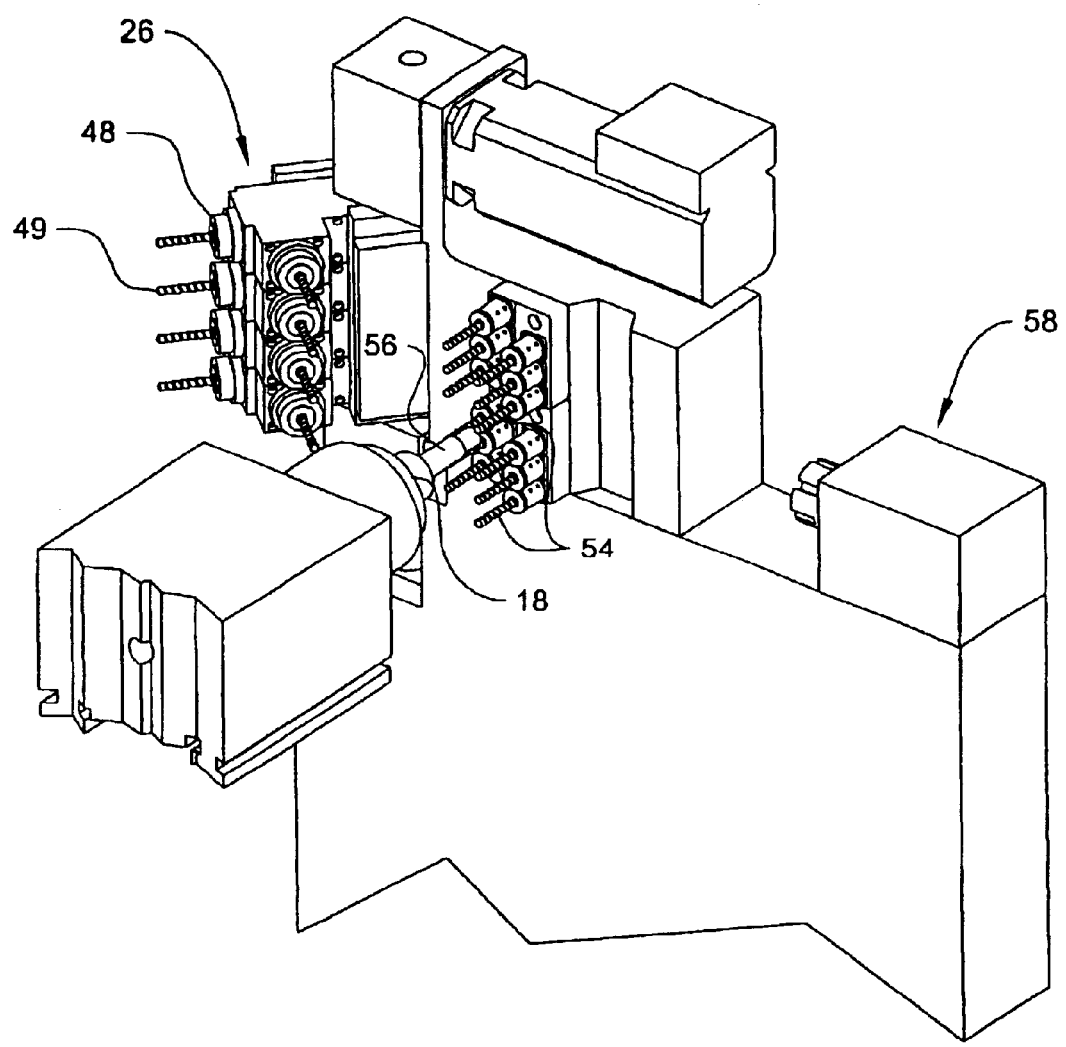
FIG. 9 is a perspective view of the internal diameter tooling of the tool frame shown in FIG. 5 engaging a workpiece.

FIG. 8 shows turning tool 51 of tool frame 75 engaging a workpiece 56. Spindle actuating mechanism 24 is controlled so that workpiece 56 held in spindle 18 is advanced as required to be turned by static tool 51. FIG. 9 shows internal diameter tool 54 engaging a workpiece 56. As indicated, the internal diameter tool is used to cut on the axis of rotation of workpiece 56. FIG. 10 shows live tool 49 engaging workpiece 56. As indicated, live tool 49 is rotatably held in live tooling spindles 48. Actuating member 26 may be pivoted in axis 23 and about axis 21 so as to provide the desired cross drilling action. As indicated in FIG. 10, live tooling blocks are supported on two perpendicular faces of member 26. Thus, spindles 48 on one face are offset from the spindles on the second face by 90-degrees. In tool frame 106 shown in FIG. 10, two internal diameter tool blocks 52 are employed, with one block positioned above the other to provide eight tools oriented in two vertical parallel lines of four.

Figure 11:
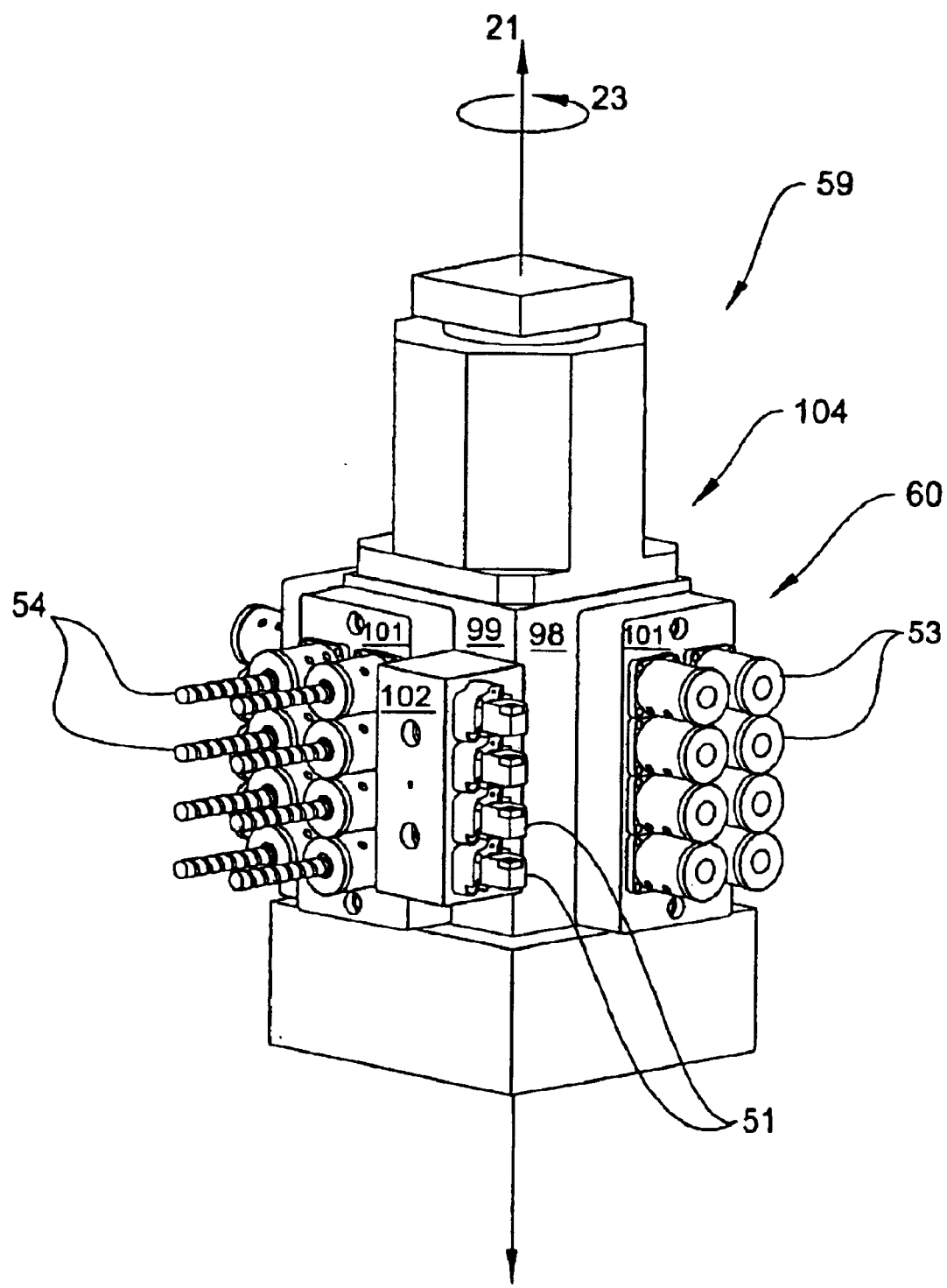
FIG. 11 is a perspective view of a second embodiment of the tool frame.
Figure 17:
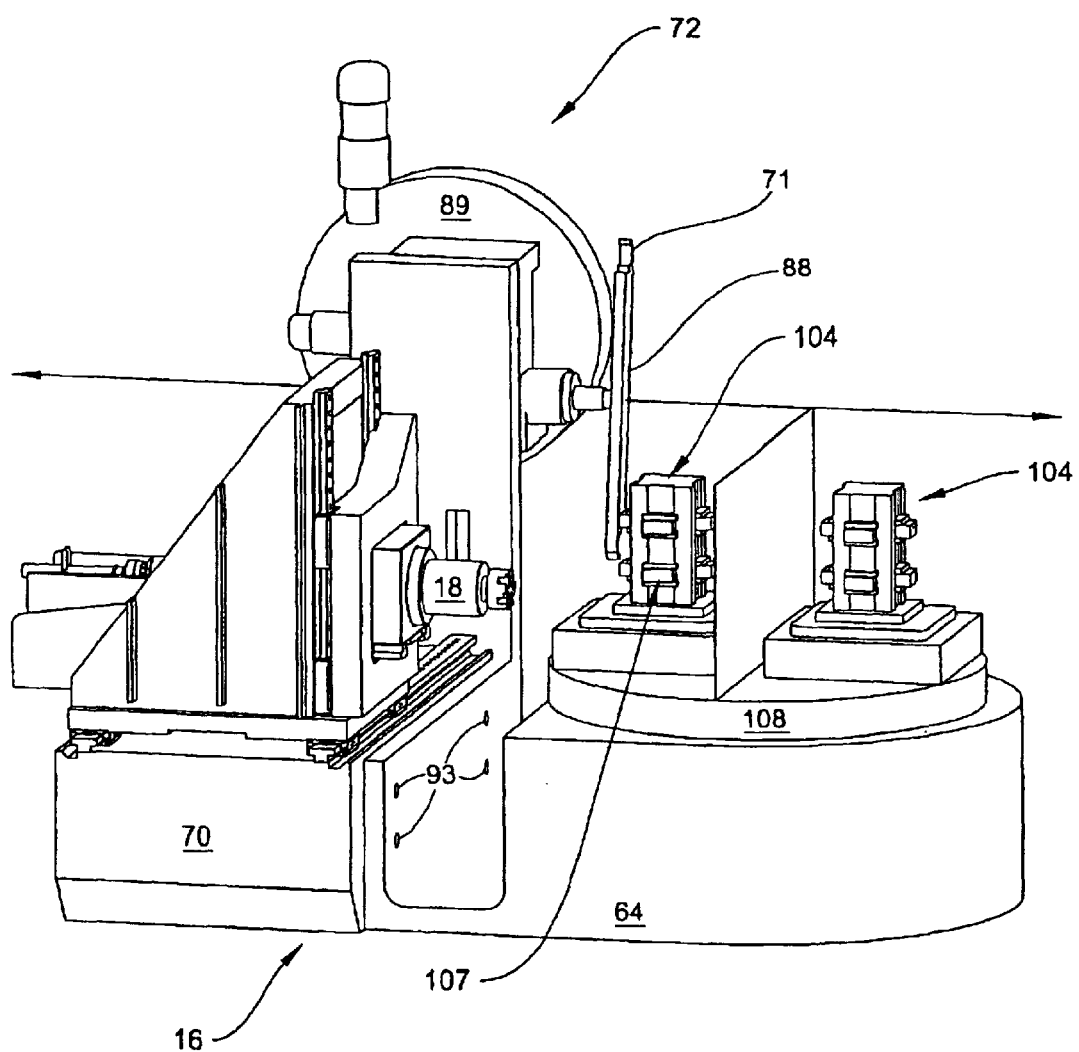
FIG. 17 is a perspective view of a tool base having a tool changer.

FIG. 11 shows an alternate embodiment of the tool frame. This "tombstone" embodiment is shown as having a polygonal support body 104 with four faces. An internal diameter tool block 101 is mounted to the right face 98 of body 104. Both an internal diameter tool block 101 having eight internal diameter tools, severally indicated at 54, and a static tool block 102 are mounted to left face 99 of frame 59. The other two faces of polygonal body 104 may support the same or alternate configurations of static tools, live tools, internal diameter tools, or a conventional turret system. Polygonal body 104 may be rotated in axis 23 about axis 21. In this embodiment, body 104 is designed to rotate 360° about axis 21. Alternatively, as shown in FIG. 17, body 104 may be mounted on a plate 108 that rotates in axis 23 and about axis 21.

Figure 12:
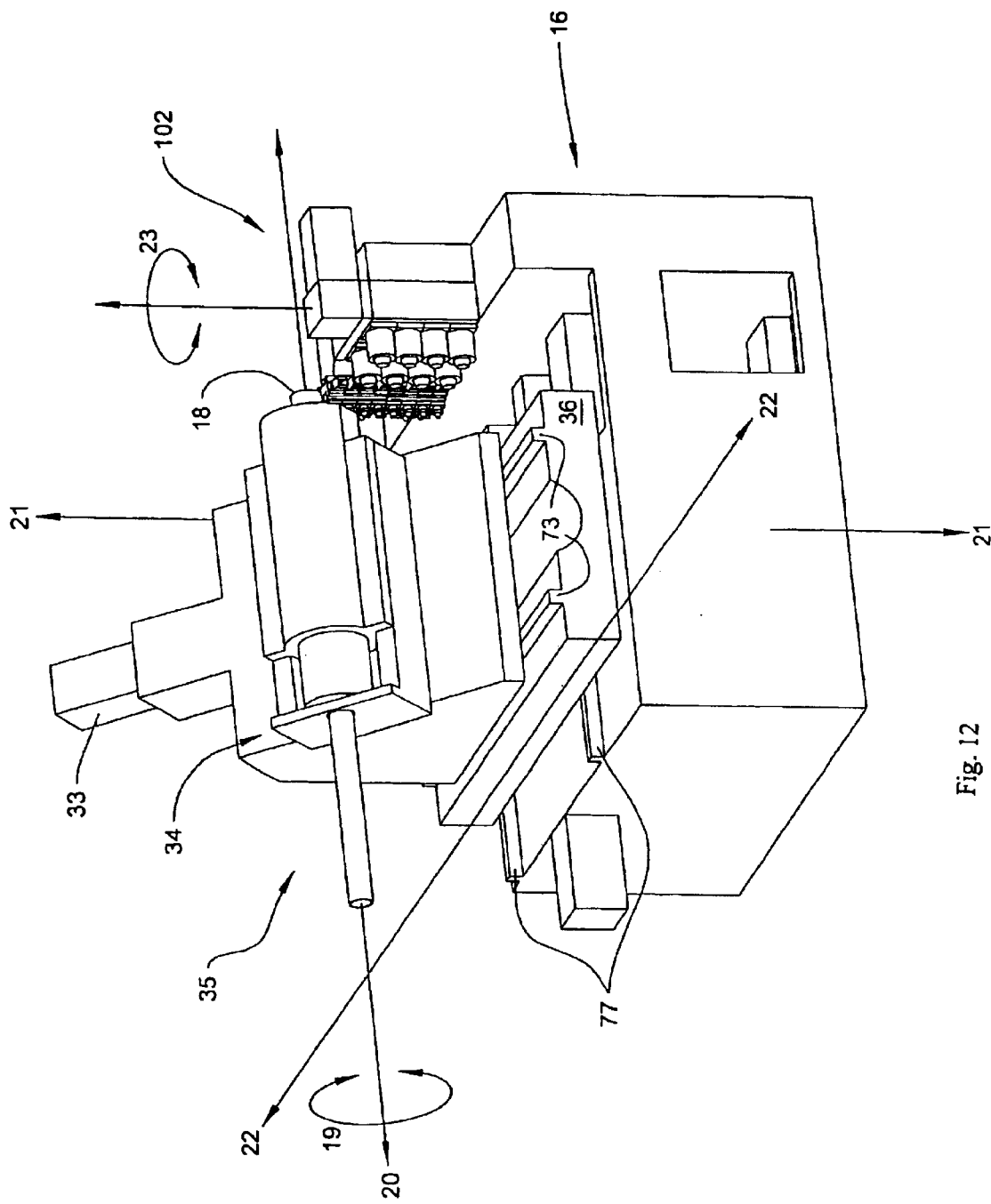
FIG. 12 is a perspective view of a second embodiment of the machine tool.

FIG. 12 is an alternate embodiment of the machine tool. This embodiment includes a support structure 16, a tool frame 102, and an actuating mechanism 35. Actuating mechanism 35 is configured differently from the embodiment shown in FIG. 1. Actuating mechanism 35 generally includes an incline member 33, an actuating slide 34, and an actuating carriage 36. Support structure 16 is shown as generally including two parallel guide rails 77 extending along axis 20. Actuating carriage 36 travels longitudinally on rails 77 along axis 20. Actuating carriage 36 in turn has two parallel guide rails 78 which are perpendicular to rails 77 and extend along axis 22. Inclined member 33 extends at a 45° angle from the top planar surface of actuating carriage 36 and is attached to a carriage that runs on rails 78 (not shown). Actuating slide 34 includes a square sleeve through which inclined member 33 extends. Slide 34 moves up and down incline member 33 thereby moving spindle 18 along axes 21 and 22 simultaneously. That is, spindle 18 will have a component of motion in both axes 21 and 22 with movement of slide 34 along incline member 33. In this way, both the height of spindle 18 as well as the horizontal position of spindle 18 may be adjusted. Member 33 also moves on rails 78 to provide alternate or added movement in axis 22. Spindle 18 moves in axis 20 with the longitudinal movement of actuating carriage 36 along rails 77.

Figure 13:
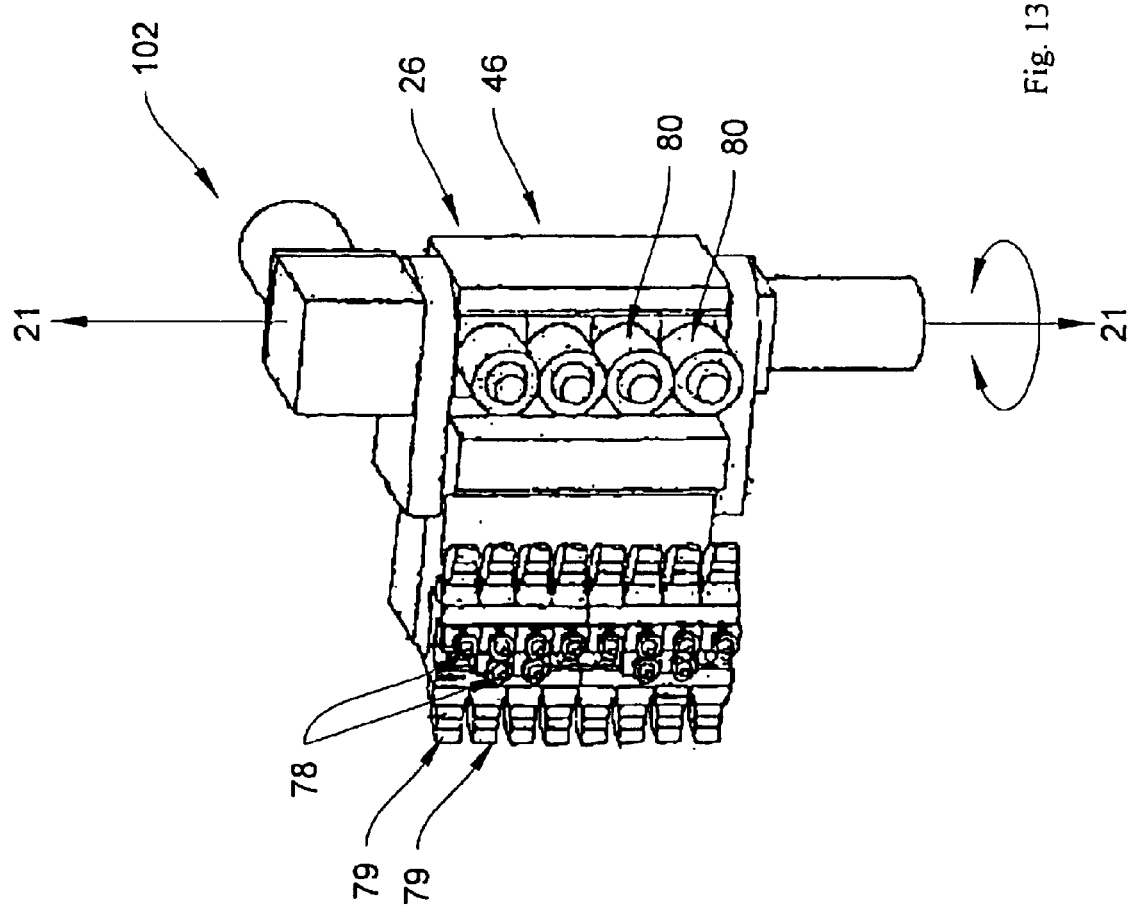
FIG. 13 is a detailed perspective view of the tool frame shown in FIG. 12.

FIG. 13 shows an alternate embodiment of the tool frame shown in FIG. 1. In this embodiment, live tooling spindles 80 are on the right side of the tool frame 102. Internal diameter tool holders, severally indicated at 78, are positioned two abreast on a vertical centerline between opposed vertical columns of static tools, severally indicated at 79.

Figure 14:
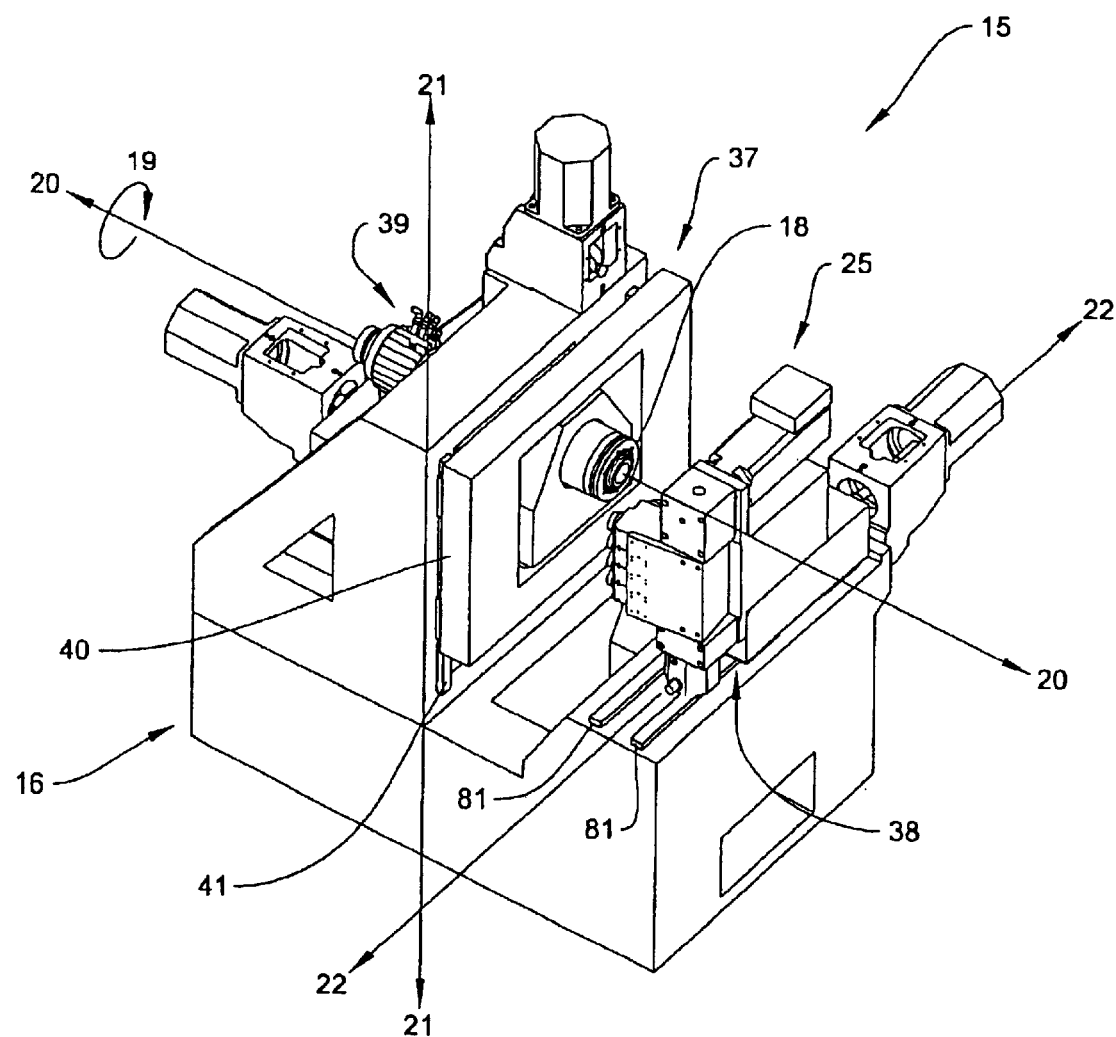
FIG. 14 is a perspective view of a third embodiment of the machine tool.

FIG. 14 shows a third alternate embodiment of the machine tool. In this embodiment, a spindle actuating mechanism 37 moves spindle 18 in axis 20 and axis 21. Structure 16 supports two parallel vertical guide rails 41 that extend along axis 21. Vertical carriage 40 travels vertically on guide rails 41 along axis 21. Vertical carriage 40 supports actuating spindle carriage 39, which operates similar to spindle carriage 28 shown in FIG. 1. Actuating mechanism 37 does not include a horizontal actuating carriage. Instead, tool frame 25 is supported on a tool frame actuating carriage 38. Structure 16 supports two parallel guide rails 81 extending along axis 22. Tool frame actuating carriage 38 travels laterally on guide rails 81 along axis 22. This embodiment, similar to the embodiment shown in FIG. 1, allows for relative movement of the spindle and tools in axes 21, 22 and 20, with spindle 18 moving relative to support structure 16 in axes 21 and 20, and tool frame 25 moving relative to support structure 16 in axis 22.

While two embodiments have been shown and described, it is contemplated that other embodiments may allow for the movement of the spindle relative to the tools in the tool frame in axes 21, 22 and 20. For example, the spindle may be moved in one of these axes and the tool frame moved in the other two axes, the tool frame may be moved in all three axes. Other combinations of movement of the spindle and tool frame may be used to provide such relative movement.

Figure 15:
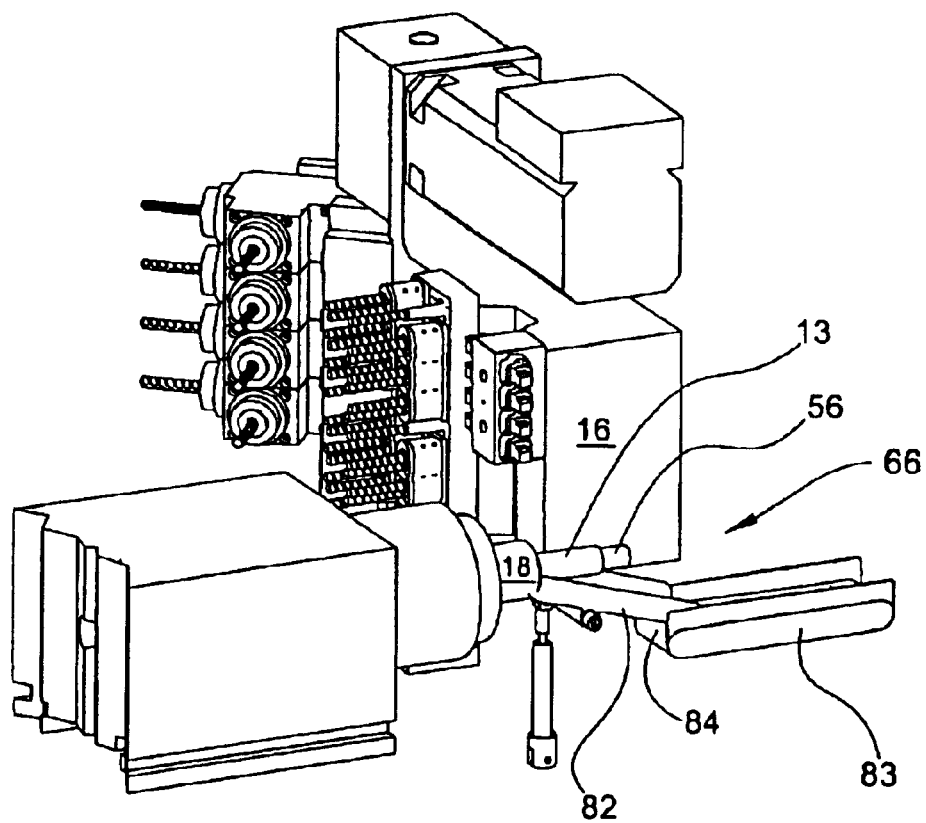
FIG. 15 is a perspective view of a tool base having a part conveyer.

FIG. 15 shows an embodiment which includes motorized workpiece conveyor 66. As shown in FIG. 15, conveyor 66 allows a workpiece 56 in spindle 18 to be automatically conveyed outside the cutting area of the machine tool. In this embodiment, a slide 82 and a conveyor system 83 are supported by structure 16. The slide is positioned at a downwardly sloping angle such that piece 56, when released by spindle 18 when spindle 18 is in a position over slide 82, will fall into slide 82 and descend down slide 82 and onto belt 84 of conveyor system 83. Belt 84 is a continuously looping belt that moves in a clockwise direction and conveys the parts on the belt to an end location for inspection or other subsequent operations.

Figure 16:
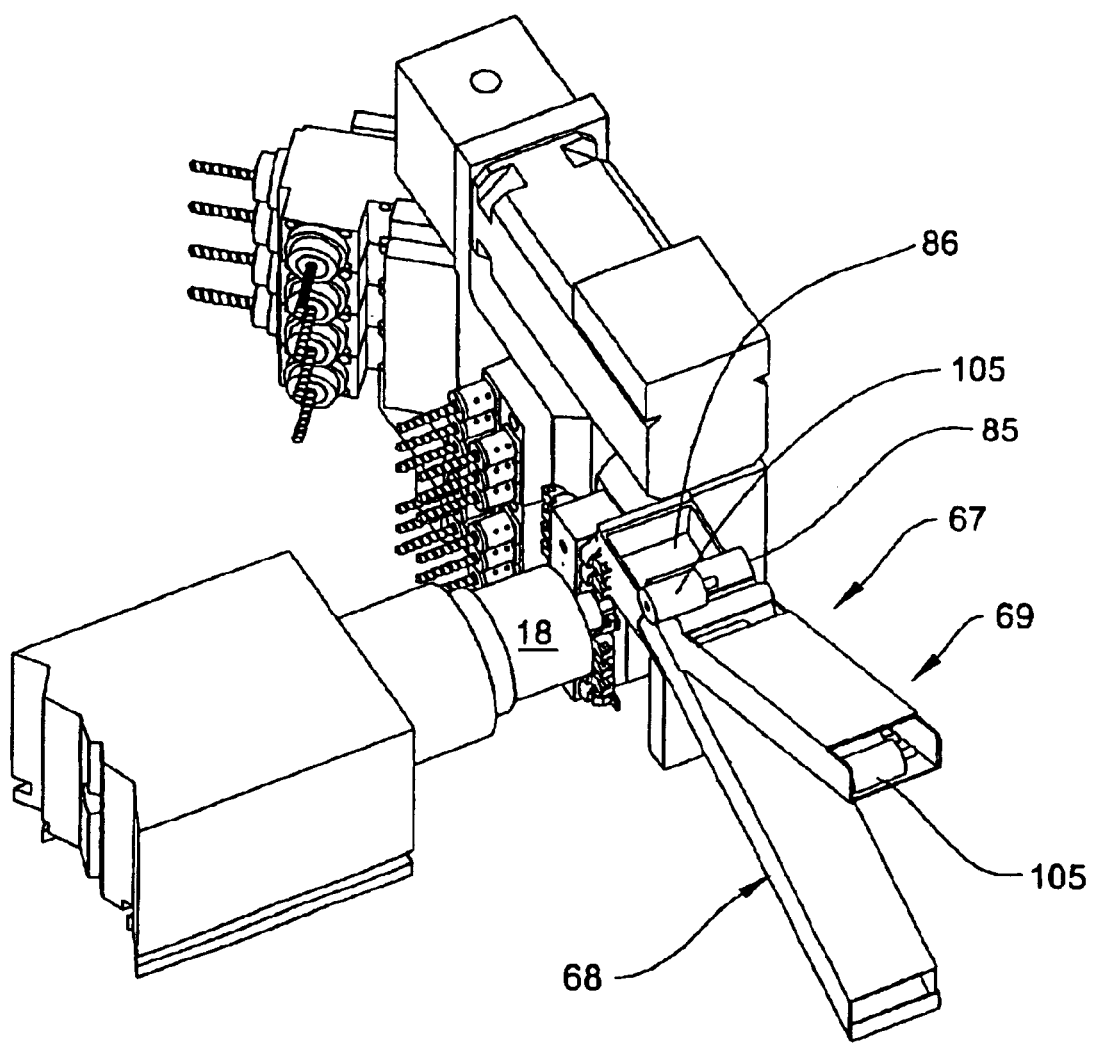
FIG. 16 is a perspective view of a tool base having a second embodiment of the part conveyor.
Figure 18:
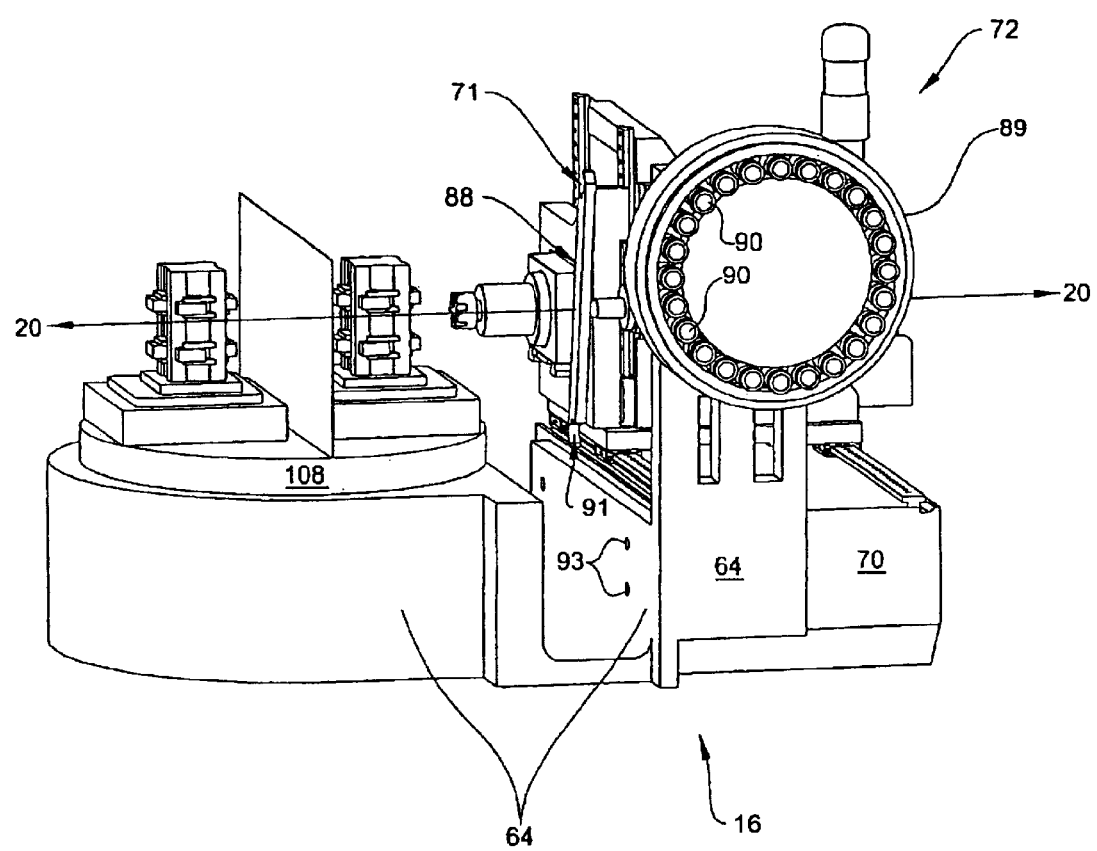
FIG. 18 is a rear perspective view of the machine tool shown in FIG. 17.
Figure 21:
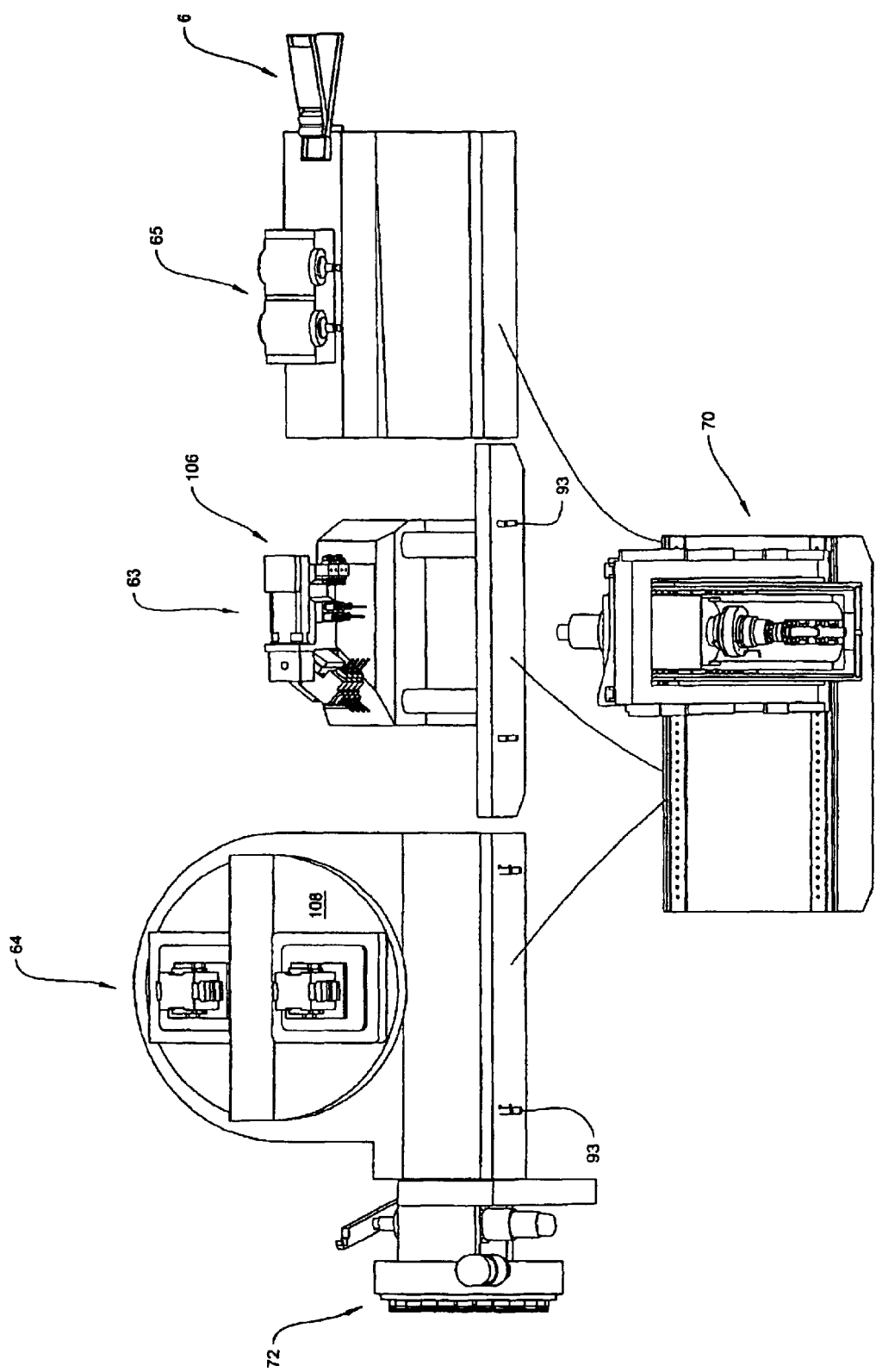
FIG. 21 is a schematic perspective view of the machine tool shown in FIG. 19 with three possible tool bases and tool frames attachable to the spindle base.

FIG. 16 shows an alternate embodiment of a conveyor. Conveyor 67 is a gravity fed conveyor having both a part feeder 69 and a return chute 68. Because of the range of motion available for spindle 18, discrete parts (slugs), severally indicated at 105, such as those from castings, forgings and pre-cut bar stock, can be machined in an automated process. A gravity escapement is all that is needed since the part 105 can be handled by the spindle without the need for an additional manipulator. As shown in FIG. 16, feeder 69 is an inclined chute. The chute is filled with individual raw parts. Raw parts 105 are gravity fed to a supply bay 85, where they are engaged by spindle 18. As a first raw part is picked up spindle 18, a second raw part drops down to fill its place in supply bay 85. The spindle visits the tools in tool frame 106 and the part is machined. As shown, conveyor 67 also includes a return chute 68 through which a finished part may be conveyed to a remote collection area. Chute 68 includes an open delivery portal 86. At completion of the machining cycle, the finished part is deposited by spindle 18 into portal 86. The finished part slides down chute 68 to a properly configured collection area. Thus, conveyor 67 has gravity fed supply and return components for full automation. The machine thus allows for automation without the use of complex part manipulator since the spindle and actuating mechanism serve this purpose. FIGS. 17 and 18 show a fourth alternate embodiment which includes a conventional tool changer 72 and a workpiece holder 107. Tool changer 72 is supported on, as shown in FIG. 21 and described below, the tool frame base 64 of structure 16. Workpiece holder 107 is supported on tool frame 59. Workpiece holder 107 is positioned on tool frame 59 so that a workpiece in spindle 18 is transferrable between spindle 18 and workpiece holder 107. In this embodiment, workpiece holder 107 has two opposed hydraulically driven jaws for engaging the workpiece. Tool changer 72 has an actuating arm 88 with tool holders 71 and 91 on either end. Arm 88 rotates about axis 20. When indexed at the appropriate position in tool carousel 89, tool 90 is rotated 90-degrees about axis 21 so as to present to tool holder 71 or 91. Tool holders 71 and 91 are positioned to allow tool 90 in tool carousel 89 to be transferred to tool holders 71 and 91. Tool carousel 89 may be rotated in a clockwise direction so as to provide indexing of a host of different tools to tool holders 71 and 91. When a workpiece is transferred from spindle 18 to workpiece holder 107 on tool frame 59, tool 90 may then be transferred by arm 88 to spindle 18, thereby converting spindle 18 into a milling machine. When milling work is completed on the workpiece by spindle 18, tool 90 may be returned to carousel 89 by arm 88 and the spindle operated to return the workpiece being held in workpiece holder 107 on tool frame 59 to spindle 18.

This feature allows for the use of the more powerful spindle 18 for live tooling work if desired, adding another level of versatility. This features also allows for the automated processing of both sides or ends of a part without the need for the dual configuration shown in FIG. 23. One end of the part can be processed with live tooling located on the tool frame, and the other end can be processed, after the transfer of the part to workpiece holder 107 and the transfer of tool 90 from tool carousel 89 and spindle 18, by tool 90 in spindle 18.

Figure 19:
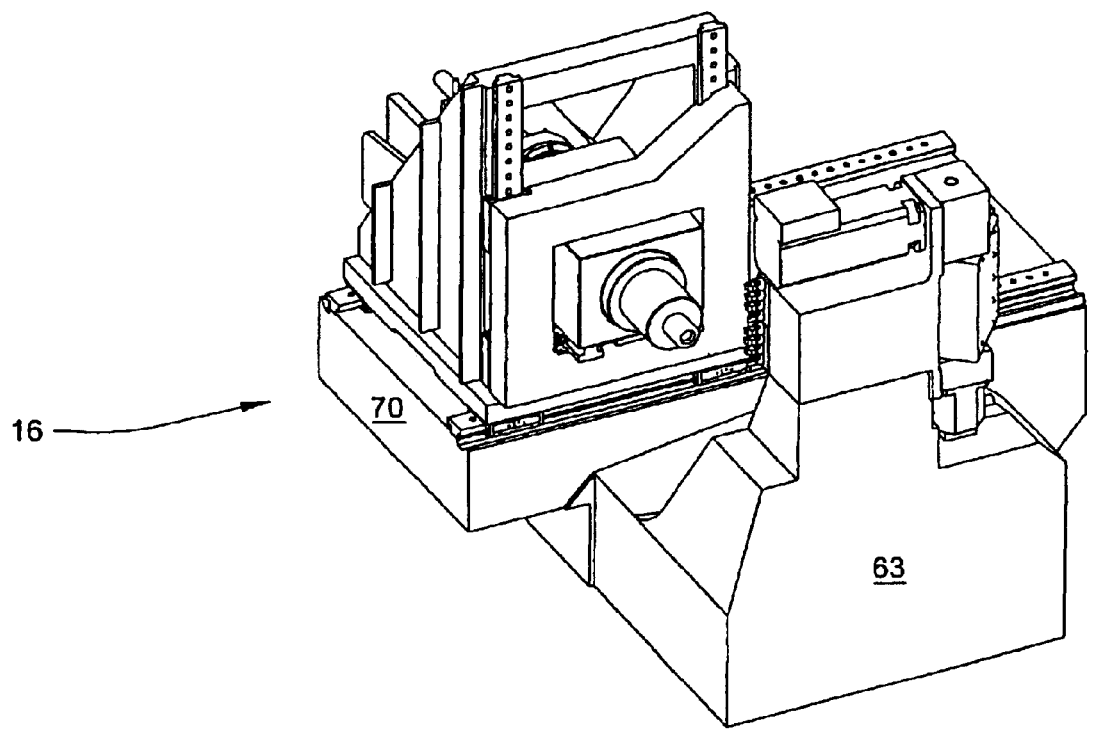
FIG. 19 is a perspective view of a fourth embodiment of the machine tool.
Figure 22:
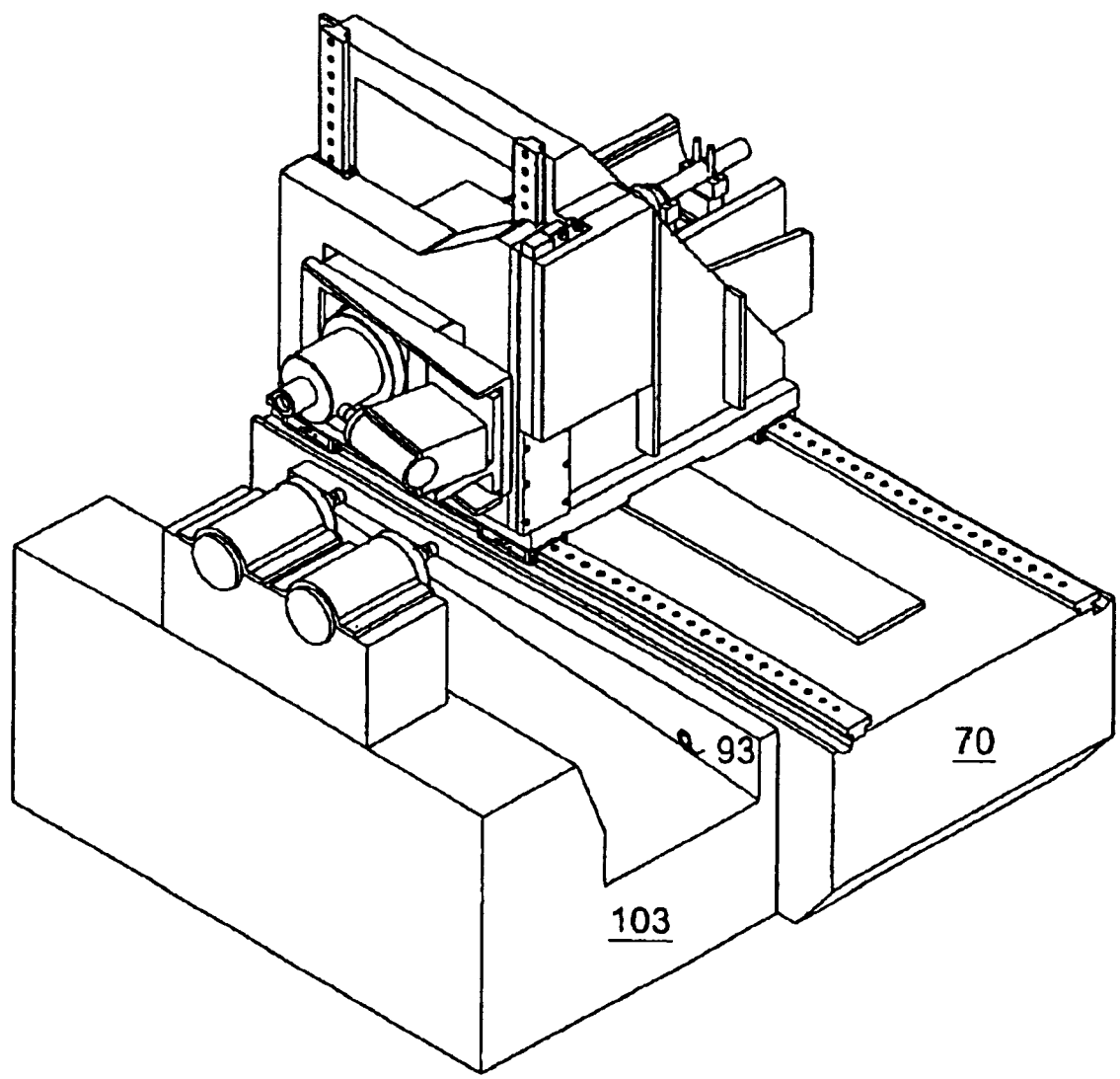
FIG. 22 is a perspective view of a tool frame base connected to a spindle base.

FIGS. 19, 21 and 22 show a fourth alternate embodiment of the machine tool. In this alternate embodiment, structure 16 comprises a spindle base 70 and a tool frame base 63. As shown in FIGS. 21 and 22, spindle base 70 and tool frame base 63 are bolted together and are readily detachable. In this embodiment, support structure 16 is not an integrally molded component, nor are tool spindle base 70 and tool frame base 63 permanently affixed. As use herein, the term integral means molded from a single continuous structure of homogeneous material.

FIG. 21 shows the modular nature of this embodiment. FIG. 21 is a schematic of the machine tool shown in FIG. 19 with three possible tool frame bases. Spindle base 70 may be used with tool frame base 64, which is shown with two tombstone tool frames 59 on a rotatable platform together with tool changer 72. If this type of tool frame and tool changer are not desired, tool frame base 64 may be detached from spindle base 70 and replaced with tool frame base 63, which is shown as having a tool frame similar to tool frame 106 shown in FIG. 10. Tool frame base 64 may in turn be replaced with tool frame base 65, which is shown as having two live tools and conveyor 67 shown in FIG. 16. Other alternate configured tool frame bases and tool frames may be employed, depending on the processes desired.

FIG. 22 shows a tool base 103, similar to tool base 65 in FIG. 21, attached to spindle base 70. As shown, a series of bolted connections 93 are used to attach spindle base 70 to tool frame 103 in a non-permanent and detachable manner, such that tool frame base 103 may be substituted with tool frame bases having other tool frame configurations or accessories, such as conveyors and tool changers.

In addition, two or more tool frame bases may be aligned along axis 22 and spindle actuating mechanism 24 may be provided with a range of motion in axis 22 such that the tools in each aligned tool frame base are accessible to a workpiece in spindle 18. This extended x-axis embodiment allows for the use of multiple tool frame bases with a single spindle base without having to detach and replace tool frame bases.

Figure 20:
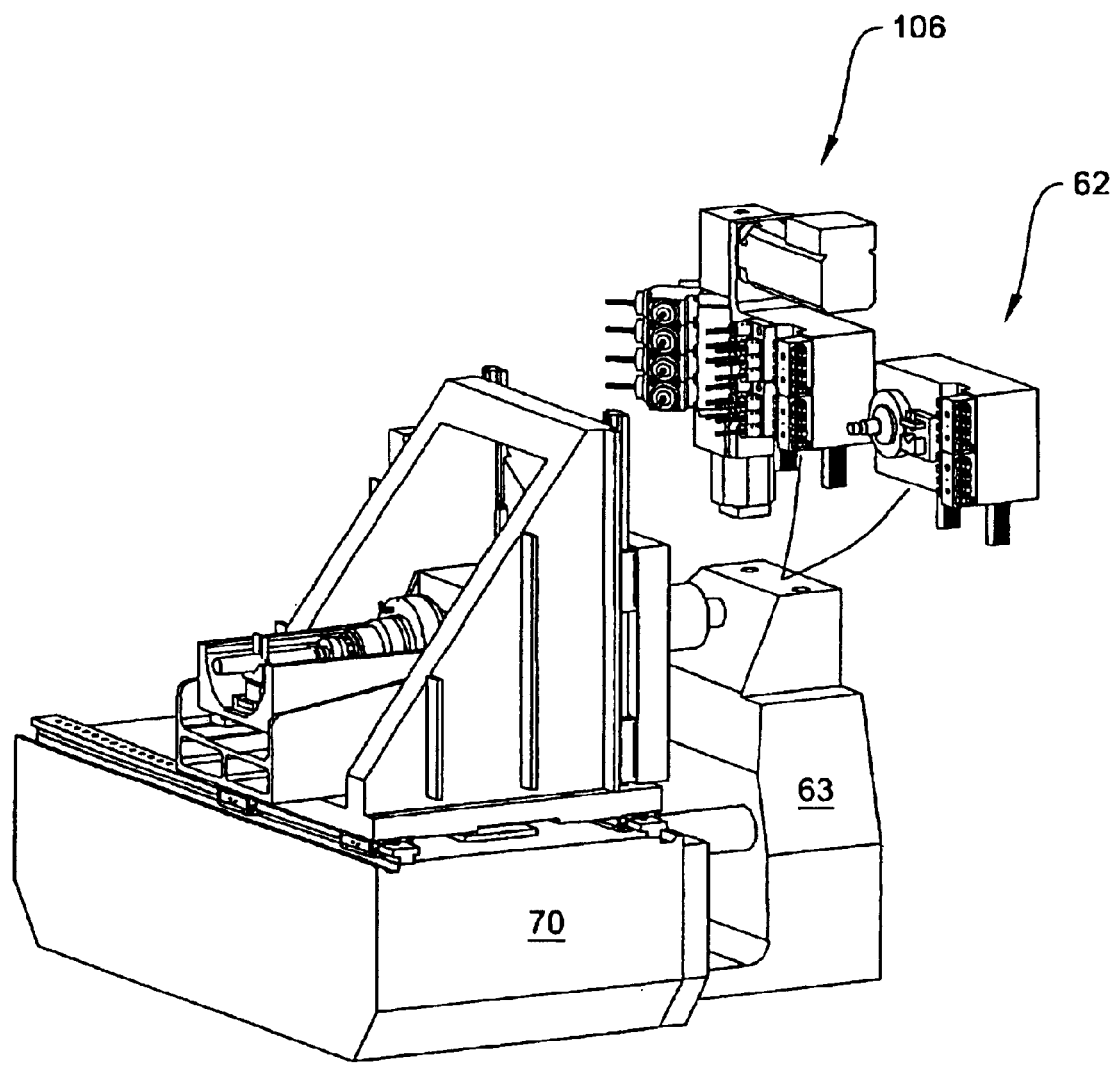
FIG. 20 is a schematic perspective view of the machine tool shown in FIG. 19 with two possible tool frames attachable to the tool frame base.

FIG. 20 is a schematic of the machine tool shown in FIG. 19 with two possible tool frames attachable to tool frame base 70. Thus, this embodiment not only includes a tool frame base detachable from the spindle base, but also a tool frame detachable from the tool frame base. This adds an additional level of modularity to machine tooling. A first configured tool frame 61 may be detachably connected to tool frame base 63. If a second configured tool frame 62 is desired, first tool frame 61 may be detached from tool frame base 63 and tool frame 62 detachably connected to tool frame base 63 as a substitute to tool frame 61. Thus, a turning tool frame 106 may be substituted with a turning/grinding tool frame having a gage 62. Other configured tool frames may be employed, depending on the processes desired. In addition, two or more differently configured tool frames may be attached to a single tool base.

Figure 23:
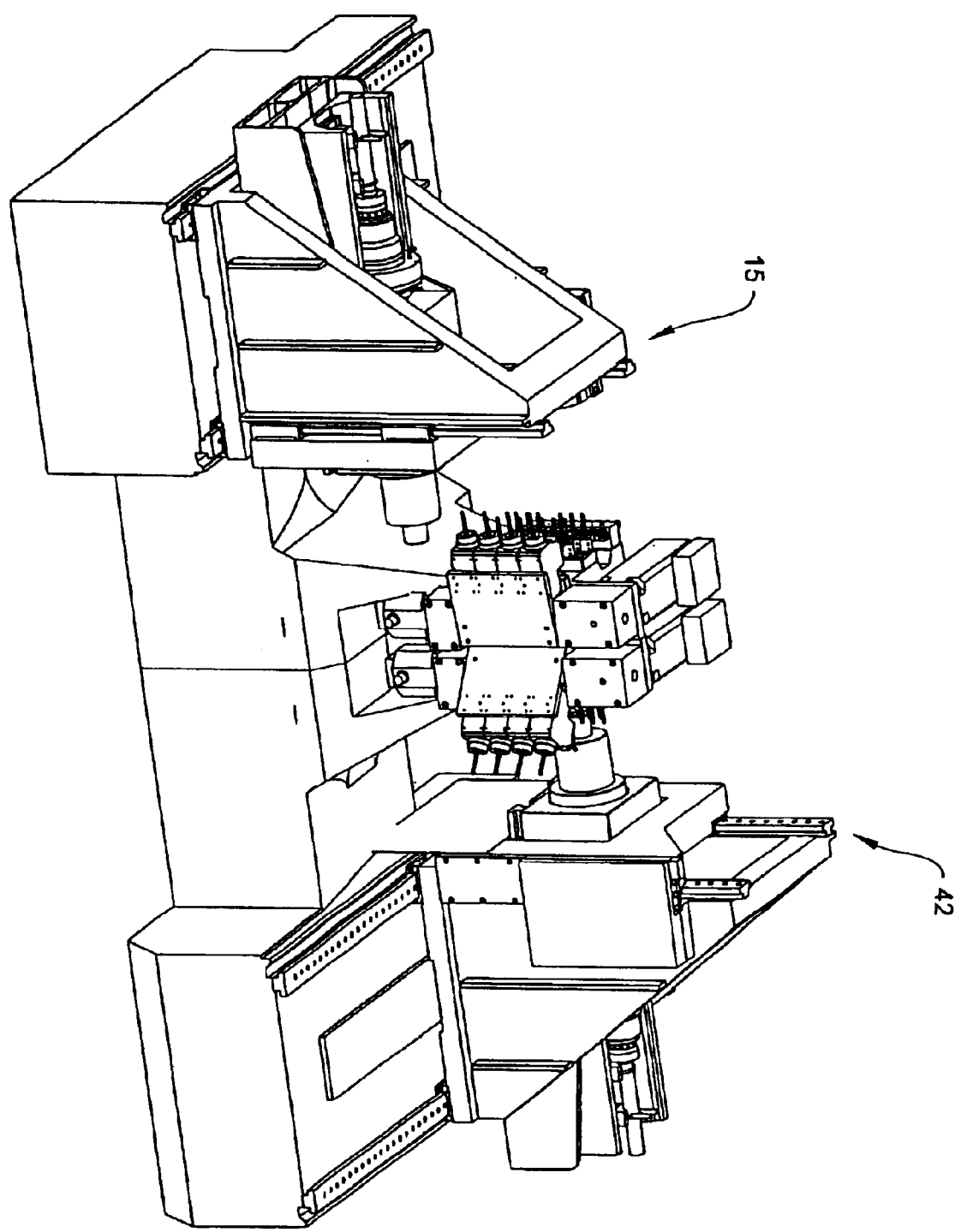
FIG. 23 is a perspective view of a dual machine tool configuration.
Figure 24:
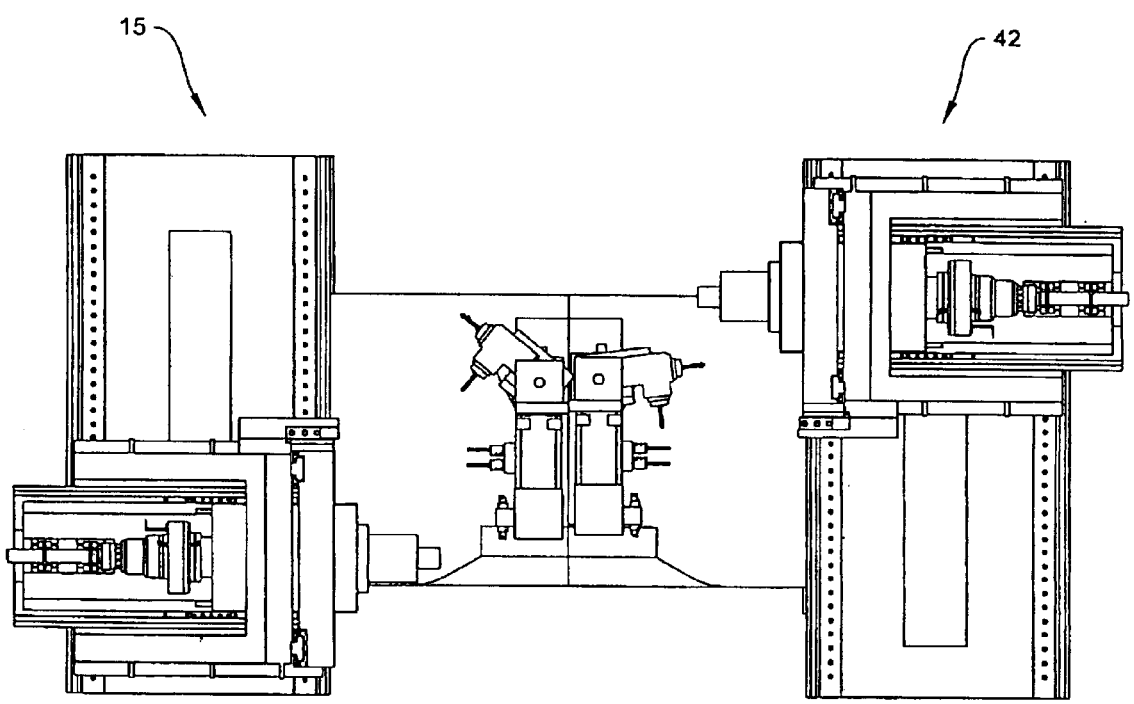
FIG. 24 is a top plan view of the dual configuration shown in FIG. 23.

To facilitate the complete machining of a part, a dual configuration may be desired to process both sides of the part. FIG. 23 shows a prospective view of a dual machine tool configuration, and FIG. 24 shows a plan view of that configuration. As shown in FIGS. 23–24, a machine tool having a tool frame shown in FIG. 4 may be attached opposite a machine tool having the tool frame configuration shown in FIG. 5. The orientation of the spindle bases and tool frames are such that the live tooling, static tooling, and internal diameter tooling on the two machines are positioned back to back. This allows for a synchronized transfer of a part from one spindle to the other on the near side of the tool frame. This type of configuration allows for finishing a workpiece in one operation. In addition, this dual configured machine tool can process two completely different parts as if there were two stand-alone machines in use, rather than one dual machine. Thus, as workload requirements shift, the user can quickly change the type of usage between dual processing of one part to simultaneous and independent processing of two parts.

Figure 25:
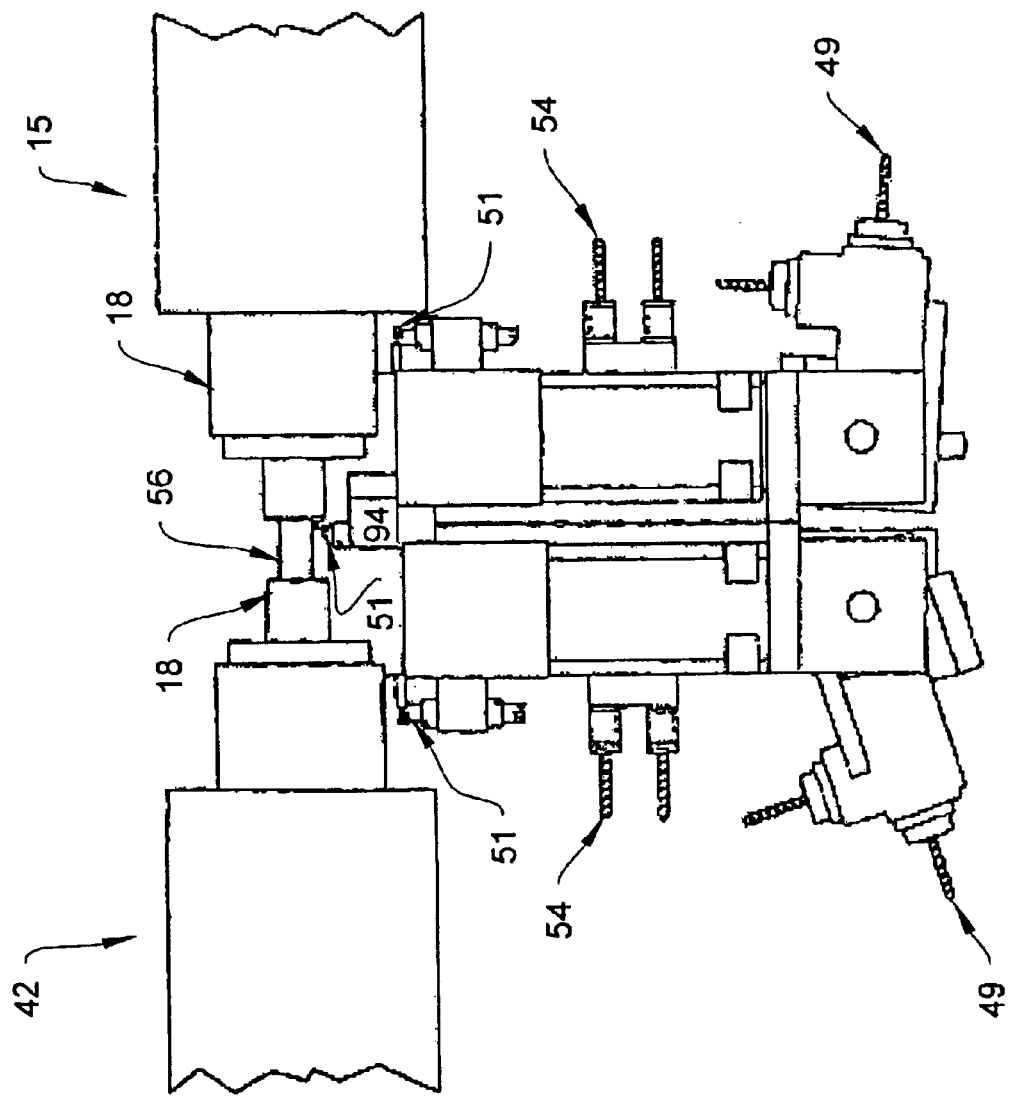
FIG. 25 is a top plan view of a dual machine tool configuration with the workpiece engaged by both spindles.

A further option with the dual configuration is to have both spindles engage opposite ends of a workpiece at the same time. FIG. 25 shows an embodiment in which the workpiece is engaged by the spindles of both machine tool 15 and 42. The embodiment show in FIG. 25 includes a third static tool block 94 positioned such that turning work may be conducted on workpiece 56 when held by the spindles of both machine tool 15 and 42.

Figure 26:
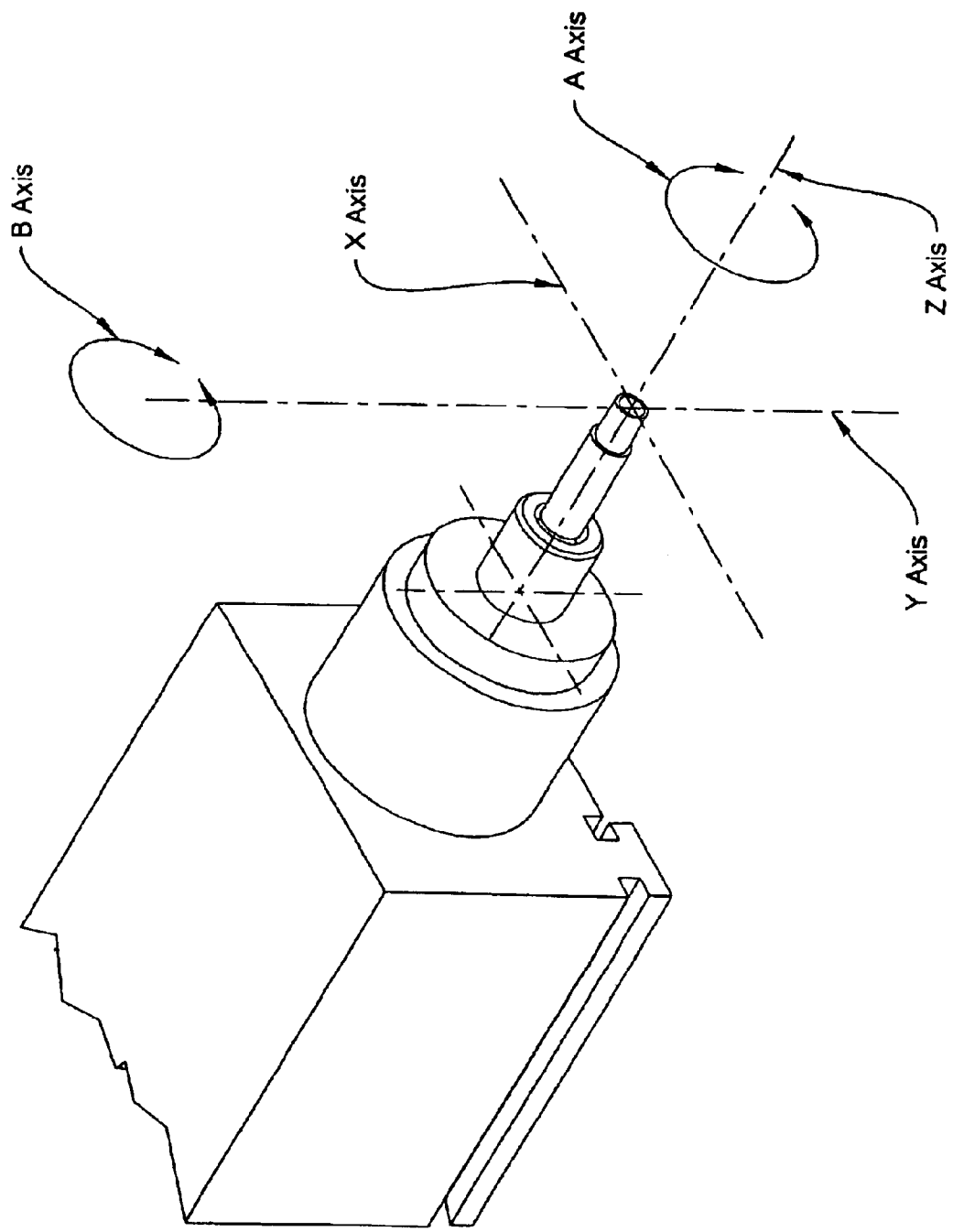
FIG. 26 is a diagram of operating axes.

FIG. 26 shows the various axes on which the components of motion of the machine tool are analyzed. FIG. 27, as discussed above, shows examples of possible configurations of work station arrays in which at least two stations, and thus the tools in such stations, are positioned to have both different X-axis 22 coordinates and different Y-axis 21 coordinates. By using such a dimensioned array, a greater amount of tooling at greater densities may be located on the tool frame, providing yet another level of versatility to the machine and greater automation and flexibility of machine processes. In particular, FIG. 27 shows an array 120 having three representative examples of subarrays, with array 109 being a grid-like rectilinear array, array 110 being an annular array, and array 115 being a V-configured rectilinear array. Arrays 109, 110 and 115 may be used alone or the array on the tool frame may comprise a combination of arrays 109, 110 or 115.

As shown in array 109, at least tool station 111 and tool station 112 have both X-axis and Y-axis coordinates that are different. Similarly, as shown in array 110, at least tool stations 116 and 117 have both X-axis and Y-axis coordinates that are different. Similarly as shown in array 115, at least tool stations 118 and 119 have both X-axis and Y-axis coordinates that are different. Also as shown, full array 120 has numerous tool stations having X-axis and Y-axis coordinates that are different.

In contrast, tool stations 111 and 121 are positioned such that they have the same X-axis coordinate, an orientation known in the prior art. Stations 111 and 121 are static tool housings 53 shown in FIG. 4, stations 116 and 117 are live tool spindles 48 shown in FIG. 4, and stations 118 and 119 are tools 51 and housings 57 in FIG. 7. Array 110 is a fixed array such that the array does not rotate about a central axis, which is different from a conventional turret.

The present invention contemplates that many changes and modifications may be made. The particular materials of which the various body parts and component parts are formed are not deemed critical and may be readily varied. Therefore, while the presently preferred form of the machine tool has been shown and described, and several modifications discussed, persons skilled in this art will readily appreciate that various additional changes and modification may be made without departing from the spirit of the invention, as defined and differentiated by the following claims.

What is claimed is:

1. A machine tool, comprising:

a support structure;

a spindle rotatably supported by said structure;

said spindle adapted for engagement with a workpiece;

said spindle operatively arranged to selectively rotate in an annular A-axis and about a linear and substantially horizontal Z-axis;

a tool frame supported by said structure;

said tool frame having an array of individual tool-holding stations adapted for engagement with a tool;

an actuating mechanism;

said actuating mechanism operatively arranged to selectively provide movement of said workpiece in said spindle relative to said tool in said tool frame in said substantially horizontal Z-axis, in a linear Y-axis that is perpendicular to said Z-axis, and in a linear X-axis that is perpendicular to both said Z-axis and said Y-axis;

the position of said stations in said array defined by at least an X-axis coordinate and a Y-axis coordinate; and at least two of said stations in said array positioned such that said two stations have neither the same X-axis coordinate nor the same Y-axis coordinate.

2. The machine tool set forth in claim 1, wherein said tool frame comprises a tool frame actuating portion, said tool frame actuating portion operatively arranged to selectively rotate in an annular axis that is about a linear axis that is not said Z-axis.

3. The machine tool set forth in claim 2, wherein said Y-axis is a substantially vertical axis and said tool frame actuating portion is operatively arranged to selectively rotate in an annular B-axis that is about said Y-axis.

4. The machine tool set forth in claim 1 wherein said actuating mechanism comprises a spindle actuating mechanism between said structure and said spindle, said spindle actuating mechanism operatively arranged to selectively move said spindle in said Z-axis, in a linear Y-axis that is perpendicular to said Z-axis, and in a linear X-axis that is perpendicular to both said Z-axis and said Y-axis.

5. The machine tool set forth in claim 4, wherein said spindle actuating mechanism comprises:

an actuating spindle carriage;

an actuating vertical carriage;

an actuating horizontal carriage;

said actuating spindle carriage between said spindle and said vertical carriage;

said vertical carriage between said spindle carriage and said horizontal carriage;

said horizontal carriage between said vertical carriage and said structure;

said spindle carriage operatively arranged to move in said Z-axis relative to said vertical carriage;

said vertical carriage operatively arranged to move in said Y-axis relative to said horizontal carriage; and said horizontal carriage operatively arranged to move in said X-axis relative to said structure.

6. The machine tool set forth in claim 4, wherein said spindle actuating mechanism is operatively arranged to simultaneously provide components of motion of said spindle in at least two axes selected from the group consisting of said Y-axis, said Z-axis and said X-axis.

7. The machine tool set forth in claim 1, wherein said array is a rectilinear array or an annular array and said position of said stations are further defined by a Z-axis coordinate and said stations have the same said Z-axis coordinate.

8. The machine tool set forth in claim 1, wherein said tool is selected from a group consisting of a live tool, a static tool, an internal diameter tool, a laser, a bar puller, a workpiece holder, an engraving tool, a stamp, and a measuring gauge.

9. The machine tool set forth in claim 1, wherein said stations are adapted to hold interchangeable tools.

10. The machine tool set forth in claim 1, wherein said array is adapted for high density tooling.

11. The machine tool set forth in claim 1, wherein:

said tool frame comprises a polygonal body having multiple faces;

at least one of said multiple faces having said array of individual tool holding stations.

12. The machine tool set forth in claim 1, wherein said tool frame is detachable from said structure and whereby an alternate tool frame is interchangeable with said first tool frame.

13. The machine tool set forth in claim 1, wherein said structure comprises a spindle base and a tool frame base.

14. The machine tool set forth in claim 1, wherein said tool frame base is detachable from said spindle base, whereby an alternate tool frame bases is interchangeable with said tool frame base.

15. The machine tool set forth in claim 1, wherein said actuating mechanism is operatively arranged to simultaneously provide components of motion of said workpiece in said spindle relative to said tool in at least two axes selected from the group consisting of said Y-axis, said Z-axis, and said X-axis.

16. The machine tool set forth in claim 1, wherein said tool holding stations are adapted to hold tooling selected from the group consisting of live tooling, inside diameter tooling and static tooling.

17. The tool frame as set forth in claim 1, wherein at least one of said tool stations is adapted to hold a tool selected from the group consisting of an internal diameter tool, a live tool, a static tool, a grinder, a laser, a super finishing head, a workpiece holder, a bar puller and a measuring gauge.

* * * * *